(12) United States Patent
Hu et al.

(10) Patent No.: US 12,025,781 B2
(45) Date of Patent: Jul. 2, 2024

(54) ZOOM LENS ASSEMBLY

(71) Applicant: ZHEJIANG SUNNY OPTICS CO., LTD., Yuyao (CN)

(72) Inventors: Yabin Hu, Yuyao (CN); Liefeng Zhao, Yuyao (CN); Fujian Dai, Yuyao (CN)

(73) Assignee: ZHEJIANG SUNNY OPTICS CO., LTD., Yuyao City (CN)

( * ) Notice: Subject to any disclaimer, the term of this patent is extended or adjusted under 35 U.S.C. 154(b) by 90 days.

(21) Appl. No.: 17/455,233

(22) Filed: Nov. 17, 2021

(65) Prior Publication Data
US 2022/0236542 A1    Jul. 28, 2022

(30) Foreign Application Priority Data

Jan. 15, 2021  (CN) .......................... 202110054926.9

(51) Int. Cl.
| | | |
|---|---|---|
| *G02B 15/14* | (2006.01) | |
| *G02B 13/00* | (2006.01) | |
| *G02B 13/02* | (2006.01) | |
| *G02B 27/00* | (2006.01) | |

(52) U.S. Cl.
CPC ......... *G02B 15/144* (2019.08); *G02B 13/009* (2013.01); *G02B 13/02* (2013.01); *G02B 27/0025* (2013.01)

(58) Field of Classification Search
CPC ................ G02B 15/144; G02B 13/009; G02B 15/144511; G02B 13/0045; G02B 15/167
See application file for complete search history.

(56) References Cited

U.S. PATENT DOCUMENTS

| | | | | |
|---|---|---|---|---|
| 2012/0212833 | A1* | 8/2012 | Hosoi .................. | G02B 15/177 359/684 |
| 2015/0077859 | A1* | 3/2015 | Kanetaka ....... | G02B 15/144511 359/664 |
| 2016/0341939 | A1* | 11/2016 | Koida ............ | G02B 15/144511 |

\* cited by examiner

*Primary Examiner* — Alicia M Harrington
(74) *Attorney, Agent, or Firm* — Sughrue Mion, PLLC

(57) ABSTRACT

The present disclosure discloses a zoom lens assembly. The zoom lens assembly comprises, sequentially along an optical axis from an object side to an image side, a first lens group comprising a first lens and a second lens; a second lens group having a positive refractive power and comprising a third lens, a fourth lens and a fifth lens; a third lens group having a negative refractive power and comprising a sixth lens; and a fourth lens group having a positive refractive power and comprising a seventh lens and an eighth lens. At least one of the first lens to the eighth lens is an aspheric lens. By changing positions of at least two lens groups in the second lens group, the third lens group and the fourth lens group on the optical axis, the zoom lens assembly switches between a wide-angle state and a telephoto state, and a focal length of the zoom lens assembly changes linearly when the zoom lens assembly switches from the wide-angle state to the telephoto state.

16 Claims, 17 Drawing Sheets

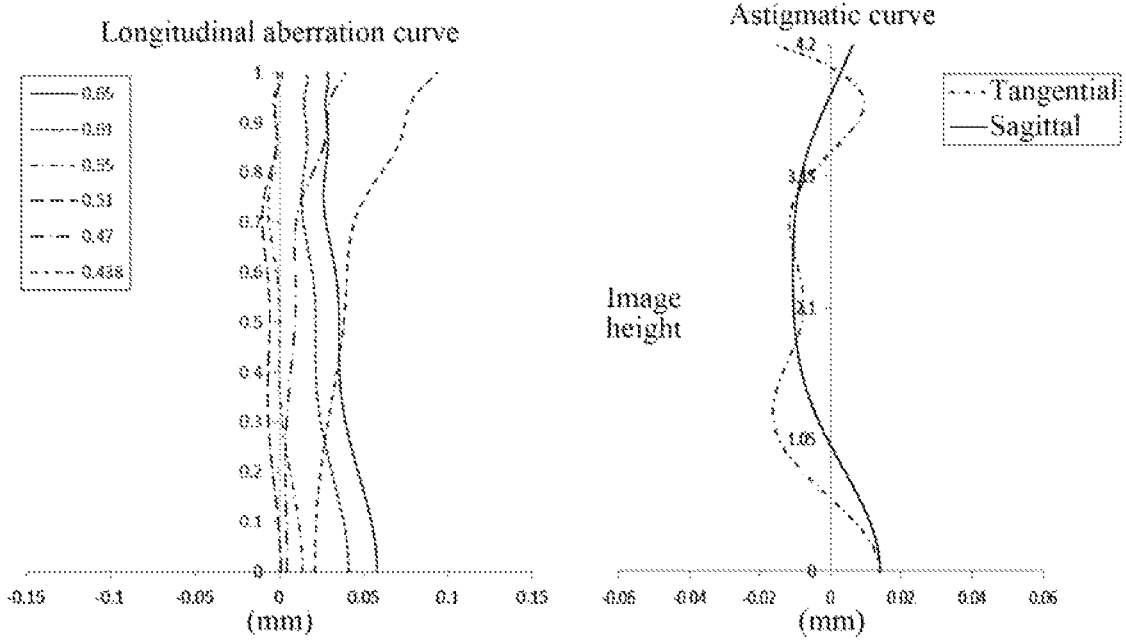
Fig. 19A
Fig. 19B
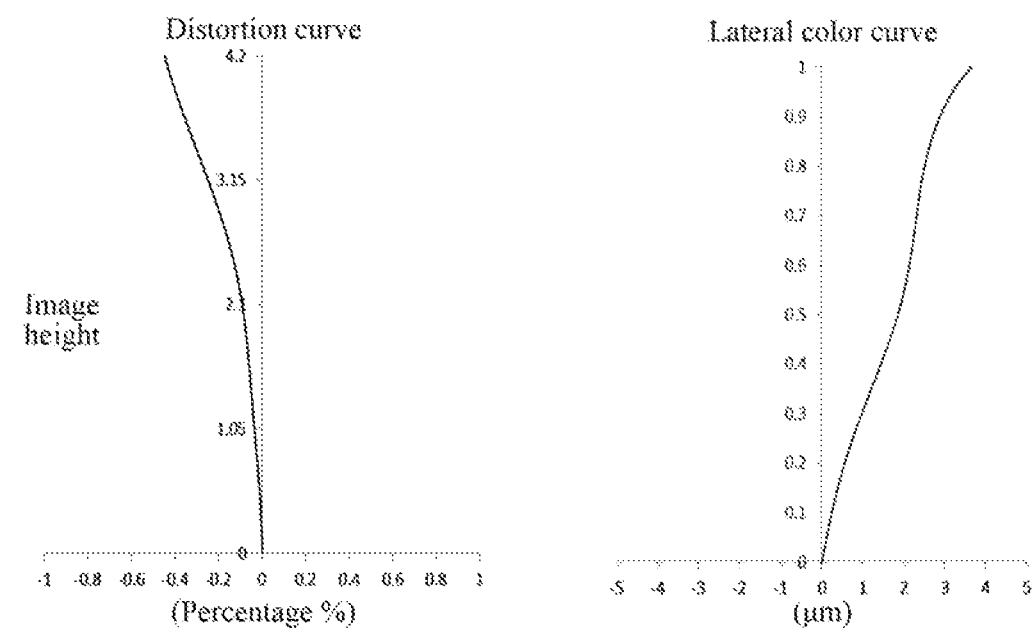
Fig. 19C
Fig. 19D

ZOOM LENS ASSEMBLY

CROSS-REFERENCE TO RELATED APPLICATIONS

This application claims the priority from Chinese Patent Application No. 202110054926.9, filed in the National Intellectual Property Administration (CNIPA) on Jan. 15, 2021, the contents of which are hereby incorporated by reference in their entirety.

TECHNICAL FIELD

Embodiments of the present disclosure relate to the field of optical element, and specifically to a zoom lens assembly having four lens groups and comprising eight lenses.

BACKGROUND

With the rapid development of smart phones, mobile phones have extensive requirements for the optical performance and functional diversification of a camera lens assembly mounted thereon. At present, the lens assembly module of a mobile phone mostly use digital focal length zooming. This focal length zooming method is achieved by switching a lens assembly, but results in a pixel loss. Not only that, with the increase of requirements of users, the lens assembly module of the mobile phone that can only achieve focal length zooming by changing a specific focal length value can no longer satisfy the daily shooting needs of people.

In order to enable the users to have more perfect photographing experience, the lens assembly module of the mobile phone that has a continuous optical zoom function is the current development trend.

SUMMARY

According to a first aspect, some embodiments of the present disclosure provide a zoom lens assembly, comprising, sequentially along an optical axis from an object side to an image side: a first lens group, comprising a first lens and a second lens; a second lens group having a positive refractive power, the second lens group comprising a third lens, a fourth lens and a fifth lens; a third lens group having a negative refractive power, the third lens group comprising a sixth lens; and a fourth lens group having a positive refractive power, the fourth lens group comprising a seventh lens and an eighth lens, where at least one of the first lens to the eighth lens is an aspheric lens, where, by changing positions on the optical axis of at least two lens groups in the second lens group, the third lens group and the fourth lens group, the zoom lens assembly switches between a wide-angle state and a telephoto state, and a focal length of the zoom lens assembly changes linearly during the zoom lens assembly switches from the wide-angle state to the telephoto state.

In some embodiments, the zoom lens assembly satisfies $0.8<f3/fG2<1.2$, where f3 is an effective focal length of the third lens, and fG2 is an effective focal length of the second lens group.

In some embodiments, the zoom lens assembly satisfies $0.8<f1/fG1<1.3$, where f1 is an effective focal length of the first lens, and fG1 is an effective focal length of the first lens group.

In some embodiments, the zoom lens assembly satisfies $-1.3<f4/f5<-0.8$, where f4 is an effective focal length of the fourth lens, and f5 is an effective focal length of the fifth lens.

In some embodiments, the zoom lens assembly satisfies $0.5<R4/R5<1$, where R4 is a radius of curvature of an image-side surface of the second lens, and R5 is a radius of curvature of an object-side surface of the third lens.

In some embodiments, the zoom lens assembly satisfies $0.8<fG4/((fw+ft)/2)<1.3$, where fG4 is an effective focal length of the fourth lens group, fw is a total effective focal length of the zoom lens assembly in the wide-angle state, and ft is a total effective focal length of the zoom lens assembly in the telephoto state.

In some embodiments, the zoom lens assembly satisfies $1<TTL/ft<1.5$, where TTL is a distance along the optical axis from an object-side surface of the first lens to an image plane of the zoom lens assembly, and ft is a total effective focal length of the zoom lens assembly in the telephoto state.

In some embodiments, the zoom lens assembly satisfies $0<10\times\Sigma ATG2/TG2<0.5$, where $\Sigma ATG2$ is a sum of a spacing distance between the third lens and the fourth lens and a spacing distance between the fourth lens and the fifth lens, and TG2 is a distance along the optical axis from the object-side surface of the third lens to an image-side surface of the fifth lens.

In some embodiments, the zoom lens assembly satisfies $1<100\times TG3/\Sigma CT<5$, where TG3 is a distance along the optical axis from an object-side surface of the sixth lens to an image-side surface of the sixth lens, and $\Sigma CT$ is a sum of respective center thicknesses of the first lens to the eighth lens along the optical axis.

In some embodiments, the zoom lens assembly satisfies $0.5<SAG71/SAG81<1.2$, where SAG71 is a distance along the optical axis from an intersection point of an object-side surface of the seventh lens and the optical axis to a vertex of an effective radius of the object-side surface of the seventh lens, and SAG81 is a distance along the optical axis from an intersection point of an object-side surface of the eighth lens and the optical axis to a vertex of an effective radius of the object-side surface of the eighth lens.

In some embodiments, the zoom lens assembly satisfies $0<SAG71/CT7<0.5$, where SAG71 is a distance along the optical axis from an intersection point of an object-side surface of the seventh lens and the optical axis to a vertex of an effective radius of the object-side surface of the seventh lens, and CT7 is a center thickness of the seventh lens.

In some embodiments, the zoom lens assembly satisfies $0.5<CT1/ET1<1$, where CT1 is a center thickness of the first lens, and ET1 is an edge thickness at the maximal effective radius of the first lens.

In some embodiments, the zoom lens assembly satisfies $1<CT7/ET7<1.6$, where CT7 is the center thickness of the seventh lens, ET7 is an edge thickness at the maximal effective radius of the seventh lens.

In some embodiments, the zoom lens assembly satisfies $0.7<DT81/ImgH<1$, where DT81 is an effective radius of the object-side surface of the eighth lens, and ImgH is half of a diagonal length of an effective pixel area on the image plane of the zoom lens assembly.

In some embodiments, the zoom lens assembly satisfies $1<DTmax/DTmin<1.5$, where DTmax is a maximal value of effective radii of lenses in the zoom lens assembly, and DTmin is a minimal value of the effective radii of lenses in the zoom lens assembly.

In some embodiments, the zoom lens assembly satisfies $-0.8<\Delta TG12/\Delta f<-0.3$, where $\Delta TG12$ is a change of a spacing distance between the first lens group and the second lens group along the optical axis when the zoom lens assembly switches from the wide-angle state to the telephoto state, and $\Delta f$ is a change of a total effective focal length of the zoom lens assembly when the zoom lens assembly switches from the wide-angle state to the telephoto state.

In some embodiments, the zoom lens assembly satisfies 0<(R13−R14)/(R13+R14)<0.5, where R13 is a radius of curvature of the object-side surface of the seventh lens, and R14 is a radius of curvature of the image-side surface of the seventh lens.

BRIEF DESCRIPTION OF THE DRAWINGS

In combination with the accompanying drawings, other features, purposes, and advantages of the present application will become more apparent through the following detailed description for the non-limiting embodiments. In the accompanying drawings:

FIGS. 19A-19D respectively show a longitudinal aberration curve, an astigmatic curve, a distortion curve and a lateral color curve of the zoom lens assembly of Embodiment 3 which is in the wide-angle state;

DETAILED DESCRIPTION OF EMBODIMENTS

Figure 1:
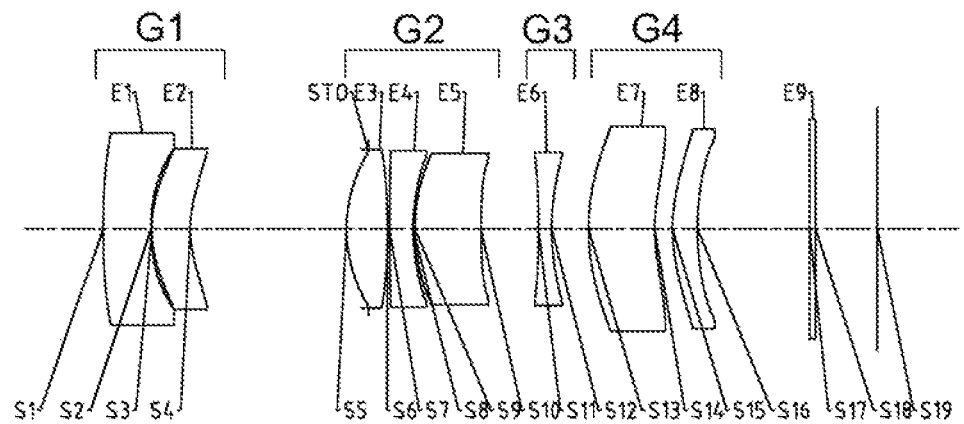
FIG. 1 is a schematic structural diagram of a zoom lens assembly according to Embodiment 1 of the present disclosure which is in a wide-angle state when an object distance is infinite.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second," and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. A surface of each lens that is closest to a photographed object is referred to as the object-side surface of the lens, and a surface of the each lens that is closest to an image side is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should be noted that the embodiments of the present disclosure and the features in the embodiments may be combined with each other on a non-conflict basis. Embodiments of the present disclosure will be described below in detail with reference to the accompanying drawings.

Features, principles, and other aspects of the present disclosure are described below in detail.

A zoom lens assembly according to exemplary implementations of the present disclosure may include four lens groups having refractive powers, which are respectively a first lens group, a second lens group, a third lens group and a fourth lens group. According to an embodiment, the first lens group may be a fixed group, and the second lens group is a zooming group, the third lens group is a compensation group, and the fourth lens group is an auto focus group. The first lens group to the fourth lens group are arranged in sequence along the optical axis of the zoom lens assembly from an object side to an image side, and there may be a spacing distance between any two adjacent lens groups.

In the exemplary implementations, the second lens group may have a positive refractive power, and the third lens group may have a negative refractive power.

In the exemplary implementations, the first lens group may include a first lens and a second lens that are arranged in sequence along the optical axis of the zoom lens assembly. The second lens group may include a third lens, a fourth lens and a fifth lens that are arranged in sequence along the optical axis of the zoom lens assembly. The third lens group may include a sixth lens. The fourth lens group may include a seventh lens and an eighth lens that are arranged in sequence along the optical axis of the zoom lens assembly.

In the exemplary implementations, by reasonably distributing the lenses in the lens groups and the refractive powers of the lens groups, the optical continuous zoom function can be realized under the premise of ensuring that the main technical parameters of the system meet certain specifications. By reasonably distributing the refractive powers of lens groups and the refractive powers of lenses in the each lens group, and by reasonably controlling the spacing distances between the lens groups, the entire system, when working, can realize the continuous zoom function by changing the spacing distances between the lens groups.

In some implementations, by changing positions on the optical axis of at least two lens groups in the second lens group, the third lens group and the fourth lens group, the zoom lens assembly may switch between a wide-angle state and a telephoto state, and a focal length of the zoom lens assembly changes linearly during the switching. When switching from the wide-angle state to the telephoto state, the focal length of the zoom lens assembly may linearly change from about 23 mm to about 13 mm.

In the exemplary implementations, the zoom lens assembly may satisfy $0.8 < f3/fG2 < 1.2$. Here, $f3$ is an effective focal length of the third lens, and $fG2$ is an effective focal length of the second lens group. When $0.8 < f3/fG2 < 1.2$ is satisfied, the ranges of the effective focal lengths of the third lens and the second lens group are constrained, which is conductive to offsetting the coma aberration in a tangential direction. Alternatively, the third lens may have a positive refractive power. For example, $f3$ and $fG2$ may satisfy $0.9 < f3/fG2 < 1.1$.

In the exemplary implementations, the zoom lens assembly may satisfy $0.8 < f1/fG1 < 1.3$. Here, $f1$ is an effective focal length of the first lens, and $fG1$ is an effective focal length of the first lens group. The refractive power of the first lens in the first lens group is reasonably distributed, which is conductive to reducing the axial spherical aberration borne by the object-side surface and image-side surface of the first lens. Alternatively, the first lens may have a negative refractive power.

In the exemplary implementations, the zoom lens assembly may satisfy $-1.3<f4/f5<-0.8$. Here, f4 is an effective focal length of the fourth lens, and f5 is an effective focal length of the fifth lens. The ratio of the focal length of the fourth lens to the focal length of the fifth lens is controlled, which is conductive to reducing the amount of astigmatism of the zoom lens assembly in a sagittal direction. Alternatively, the fourth lens may have a negative refractive power, and the fifth lens may have a positive refractive power.

In the exemplary implementations, the zoom lens assembly may satisfy $0.5<R4/R5<1$. Here, R4 is a radius of curvature of an image-side surface of the second lens, and R5 is a radius of curvature of an object-side surface of the third lens. By constraining the ratio of the radius of curvature of the image-side surface of the second lens to the radius of curvature of the object-side surface of the third lens, the position of the ghost image generated by the reflection between the aforementioned two surfaces moves to the edge of the image-side surface, which is conductive to reducing the risk of the ghost image. Alternatively, the image-side surface of the second lens may be a concave surface, and the object-side surface of the third lens may be a convex surface.

In the exemplary implementations, the zoom lens assembly may satisfy $0.8<fG4/((fw+ft)/2)<1.3$. Here, fG4 is an effective focal length of the fourth lens group, fw is a total effective focal length of the zoom lens assembly in the wide-angle state, and ft is a total effective focal length of the zoom lens assembly in the telephoto state. More particularly, the zoom lens assembly may satisfy $0.9<fG4/((fw+ft)/2)<1.2$. Satisfying $0.8<fG4/((fw+ft)/2)<1.3$ is conductive to controlling the effective focal length of the fourth lens group, such that the fourth lens group can reduce the amount of astigmatism in the tangential direction at different focal lengths of the zoom lens assembly.

In the exemplary implementations, the zoom lens assembly may satisfy $1<TTL/ft<1.5$. Here, TTL is a distance along the optical axis from the object-side surface of the first lens to an image plane of the zoom lens assembly, and ft is the total effective focal length of the zoom lens assembly in the telephoto state. More particularly, the zoom lens assembly may satisfy $1.1<TTL/ft<1.3$. The total track length of the zoom lens assembly is controlled within a reasonable range, which is conductive realize the continuous zoom function of the zoom lens assembly from the wide-angle state to the telephoto state. The ratio of the total track length of the zoom lens assembly to the total effective focal length of the zoom lens assembly in the telephoto state is constrained, which is conductive to controlling the overall size of the zoom lens assembly and achieving the five times optical zoom effect of the zoom lens assembly (under the equivalent focal length) at the same time.

In the exemplary implementations, the zoom lens assembly may satisfy $0<10\times\Sigma ATG2/TG2<0.5$. Here, $\Sigma ATG2$ is a sum of spacing distances between any two adjacent lenses in the second lens group along the optical axis, and TG2 is a distance along the optical axis from the object-side surface of the third lens to an image-side surface of the fifth lens. Satisfying $0<10\times\Sigma ATG2/TG2<0.5$ is conductive to controlling the spacing distance between two adjacent lenses in the second lens group along the optical axis in a small range, such that the lenses in the second lens group fit more closely, and the lateral color of the zoom lens assembly is further reduced through the difference of high and low refractive indexes and the difference between Abbe number materials.

In the situation where the second lens group includes the third lens, the fourth lens and the fifth lens, $\Sigma ATG2$ is a sum of a spacing distance between the third lens and the fourth lens along the optical axis and a spacing distance between the fourth lens and the fifth lens along the optical axis.

In the exemplary implementations, the zoom lens assembly may satisfy $1<100\times TG3/\Sigma CT<5$. Here, TG3 is a distance along the optical axis from an object-side surface of the sixth lens to an image-side surface of the sixth lens, and $\Sigma CT$ is a sum of respective center thicknesses of the first lens to the eighth lens along the optical axis. Satisfying $1<100\times TG3/\Sigma CT<5$ is conductive to ensuring that the center thickness of the sixth lens is within a reasonable process range, and at the same time, is conductive to reducing the amount of astigmatism in the tangential direction as much as possible. Alternatively, the image-side surface of the sixth lens may be a concave surface. For example, TG3 and $\Sigma CT$ may satisfy $2<100\times TG3/\Sigma CT<4.2$.

In the exemplary implementations, the zoom lens assembly may satisfy $0.5<SAG71/SAG81<1.2$. Here, SAG71 is a distance along the optical axis from an intersection point of an object-side surface of the seventh lens and the optical axis to a vertex of an effective radius of the object-side surface of the seventh lens, and SAG81 is a distance along the optical axis from an intersection point of an object-side surface of the eighth lens and the optical axis to a vertex of an effective radius of the object-side surface of the eighth lens. The ratio of the sagittal heights of the object-side surface of the seventh lens and the object-side surface of the eighth lens is constrained, which is conductive reducing the energy per unit area of the ghost image generated by the two surfaces. Alternatively, the object-side surface of the seventh lens may be a convex surface, and the object-side surface of the eighth lens may be a convex surface.

In the exemplary implementations, the zoom lens assembly may satisfy $0<SAG71/CT7<0.5$. Here, SAG71 is the distance along the optical axis from the intersection point of the object-side surface of the seventh lens and the optical axis to the vertex of the effective radius of the object-side surface of the seventh lens, and CT7 is a center thickness of the seventh lens. By controlling the ratio of the sagittal height of the seventh lens to the center thickness of the seventh lens, the edge inclination of the object-side surface of the seventh lens may be controlled within a reasonable range. For example, SAG71 and CT7 may satisfy $0.2<SAG71/CT7<0.5$.

In the exemplary implementations, the zoom lens assembly may satisfy $0.5<CT1/ET1<1$. Here, CT1 is a center thickness of the first lens, and ET1 is an edge thickness at the maximal effective radius of the first lens. The ratio of the center thickness of the first lens to the edge thickness of the first lens is controlled, which is conductive to constraining the thickness of the first lens to ensure the strength of the first lens. In addition, the shape of the first lens can be controlled, which is conductive to reducing the spherical aberration of the zoom lens assembly. For example, CT1 and ET1 may satisfy $0.7<CT1/ET1<0.9$.

In the exemplary implementations, the zoom lens assembly may satisfy $1<CT7/ET7<1.6$. Here, CT7 is the center thickness of the seventh lens, ET7 is an edge thickness at the maximal effective radius of the seventh lens. When $1<CT7/ET7<1.6$ is satisfied, the shape of the seventh lens may be controlled within a reasonable processing range, which is conductive to ensuring the shaping process of the surface of the seventh lens. For example, CT7 and ET7 may satisfy $1.1<CT7/ET7<1.6$.

In the exemplary implementations, the zoom lens assembly may satisfy $0.7<DT81/ImgH<1$. Here, DT81 is an effective radius of the object-side surface of the eighth lens, and ImgH is half of a diagonal length of an effective pixel area on the image plane of the zoom lens assembly. The effective radius of the object-side surface of the eighth lens is controlled, such that the overall size of the fourth lens group meets a requirement, and at the same time, the trimming ratio of the eighth lens is controlled within a reasonable range.

In the exemplary implementations, the zoom lens assembly may satisfy $1<DTmax/DTmin<1.5$. Here, DTmax is a maximal value of effective radii of lenses in the zoom lens assembly, and DTmin is a minimal value of the effective radii of lenses in the zoom lens assembly. In consideration of the trimming form of lenses that is adopted by the zoom lens assembly in practice, the ratio of the maximal value of the effective radius of the each lens to the minimal value of the effective radius is controlled, to reduce the impact of the trimming on the relative illuminance, etc. of the zoom lens assembly as much as possible. For example, DTmax and DTmin may satisfy $1.3<DTmax/DTmin<1.5$.

In the exemplary implementations, the zoom lens assembly may satisfy $-0.8<\Delta TG12/\Delta f<-0.3$. Here, $\Delta TG12$ is a change of a spacing distance (i.e., T1) between the first lens group and the second lens group along the optical axis when the zoom lens assembly switches from the wide-angle state to the telephoto state, and $\Delta f$ is a change of a total effective focal length of the zoom lens assembly when the zoom lens assembly is adjusted from the wide-angle state to the telephoto state. By controlling the change of the spacing distance between the first lens group and the second lens group in the direction of the optical axis during the changing of the zoom lens assembly from the telephoto state to the wide-angle state, it is ensured that the stroke of the motor during the focal length zooming is within a required reasonable range.

In the exemplary implementations, the zoom lens assembly may satisfy $0<(R13-R14)/(R13+R14)<0.5$. Here, R13 is a radius of curvature of the object-side surface of the seventh lens, and R14 is a radius of curvature of the image-side surface of the seventh lens. The radii of curvature of the object-side surface and image-side surface of the seventh lens are constrained within a certain range, which is conductive to reducing the amount of primary spherical aberration of the zoom lens assembly and further correcting the amount of optical distortion of the zoom lens assembly. Alternatively, the object-side surface of the seventh lens may be a convex surface, and the image-side surface of the seventh lens may be a concave surface. For example, R13 and R14 may satisfy $0.05<(R13-R14)/(R13+R14)<0.2$.

In the exemplary implementations, the zoom lens assembly may further include a stop disposed between the first lens group and the second lens group. Alternatively, the zoom lens assembly may further include an optical filter for correcting color deviations and/or a protective glass for protecting a photosensitive element on the image plane.

The zoom lens assembly according to the above implementations of the present disclosure may use a plurality of lenses, for example, the eight lenses described above. By reasonably distributing the refractive powers and the surface types of the lenses, the center thicknesses of the lenses, the axial spacings between the lenses, etc., it is possible to effectively reduce the size of the zoom lens assembly, and enhance the processibility of the zoom lens assembly, such that the zoom lens assembly is more conductive to the production and processing and is applicable to the portable electronic products. The zoom lens assembly with the above configuration may have features such as continuous focal length zooming, focusing that can be achieved at different object distances, and good imaging quality.

In the implementations of the present disclosure, at least one of the surfaces of the lenses is an aspheric surface. That is, at least one of the surfaces from the object-side surface of the first lens to the image-side surface of the eighth lens is an aspheric surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration (i.e., the astigmatic aberration). The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens, the fifth lens, the sixth lens, the seventh lens and the eighth lens is an aspheric surface. Alternatively, the object-side surface and the image-side surface of each of the first lens, the second lens, the third lens, the fourth lens, the fifth lens, the sixth lens, the seventh lens and the eighth lens are aspheric surfaces.

However, it should be understood by those skilled in the art that the various results and advantages described in the present specification may be obtained by changing the number of the lenses constituting the zoom lens assembly without departing from the technical solution described in embodiments of the present disclosure. For example, although the zoom lens assembly having eight lenses is described as an example in the implementations, the zoom lens assembly is not limited to the eight lenses. If desired, the zoom lens assembly may also include other numbers of lenses.

Specific embodiments of the zoom lens assembly that may be applied to the above implementations are further described below with reference to the accompanying drawings.

Embodiment 1

Figure 2:
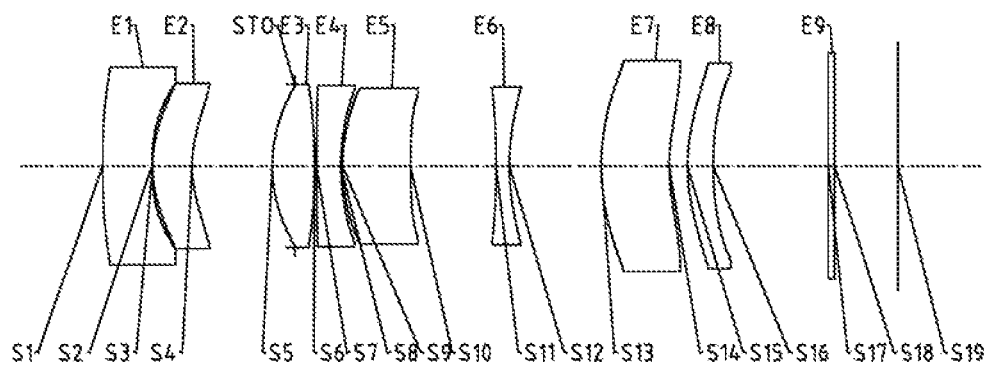
FIG. 2 is a schematic structural diagram of the zoom lens assembly according to Embodiment 1 of the present disclosure which is in an intermediate state in a process of switching from the wide-angle state to a telephoto state when the object distance is infinite.
Figure 3:
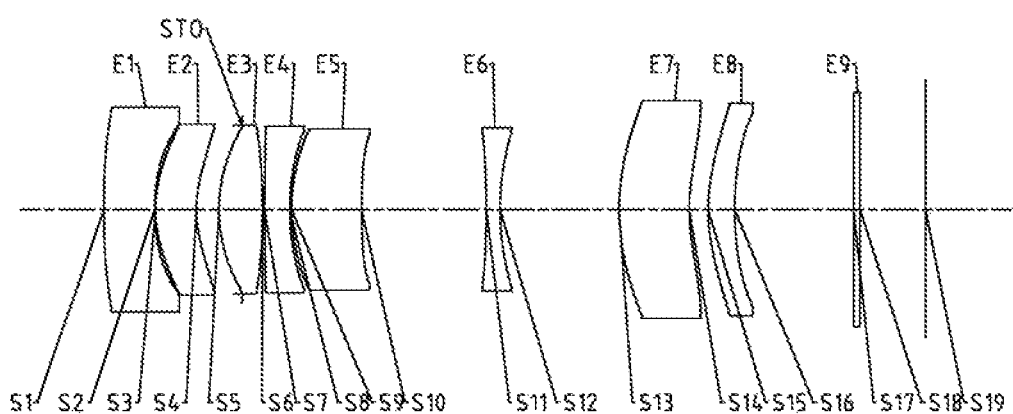
FIG. 3 is a schematic structural diagram of the zoom lens assembly according to Embodiment 1 of the present disclosure which is in the telephoto state when the object distance is infinite.
Figure 4:
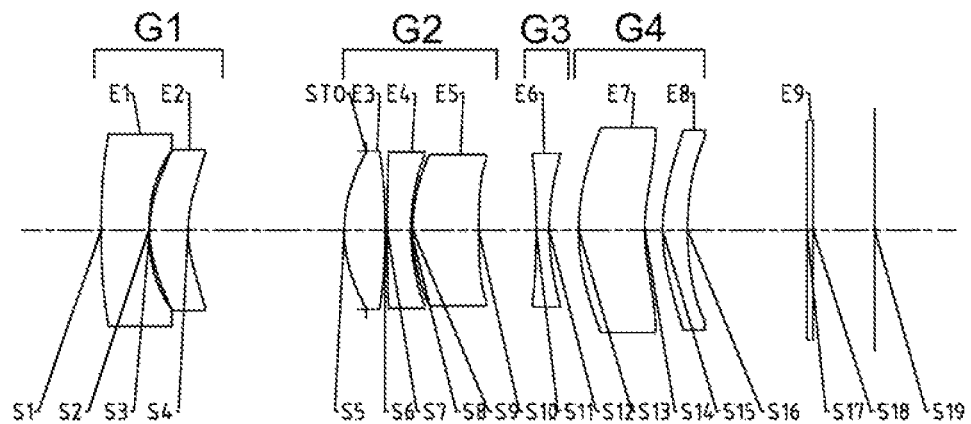
FIG. 4 is a schematic structural diagram of the zoom lens assembly according to Embodiment 1 of the present disclosure which is in the wide-angle state when the object distance is 1000 mm.
Figure 5:
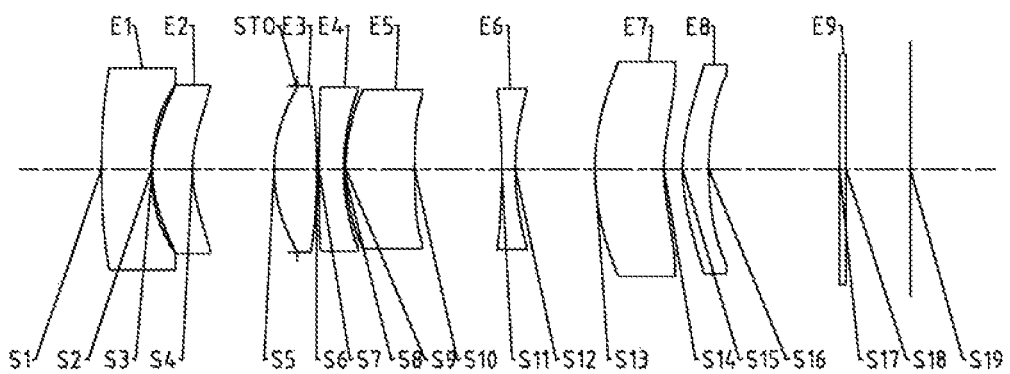
FIG. 5 is a schematic structural diagram of the zoom lens assembly according to Embodiment 1 of the present disclosure which is in the intermediate state in the process of switching from the wide-angle state to the telephoto state when the object distance is 1000 mm.
Figure 6:
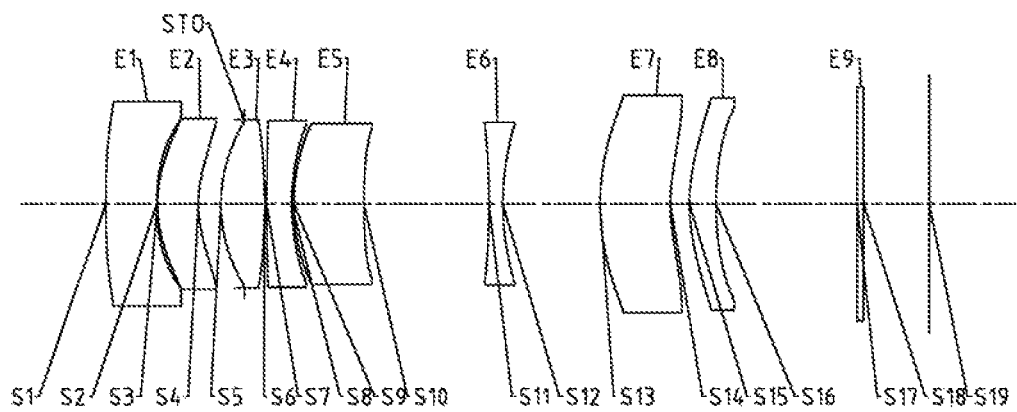
FIG. 6 is a schematic structural diagram of the zoom lens assembly according to Embodiment 1 of the present disclosure which is in the telephoto state when the object distance is 1000 mm.

A zoom lens assembly according to Embodiment 1 of the present disclosure is described below with reference to FIGS. 1-9D. FIG. 1 is a schematic structural diagram of the zoom lens assembly according to Embodiment 1 of the present disclosure which is in a wide-angle state when an object distance is infinite. FIG. 2 is a schematic structural diagram of the zoom lens assembly according to Embodiment 1 of the present disclosure which is in an intermediate state in a process of switching from the wide-angle state to a telephoto state when the object distance is infinite. FIG. 3 is a schematic structural diagram of the zoom lens assembly according to Embodiment 1 of the present disclosure which is in the telephoto state when the object distance is infinite. FIG. 4 is a schematic structural diagram of the zoom lens assembly according to Embodiment 1 of the present disclosure which is in the wide-angle state when the object distance is 1000 mm. FIG. 5 is a schematic structural diagram of the zoom lens assembly according to Embodiment 1 of the present disclosure which is in the intermediate state in the process of switching from the wide-angle state to the telephoto state when the object distance is 1000 mm. FIG. 6 is a schematic structural diagram of the zoom lens assembly according to Embodiment 1 of the present disclosure which is in the telephoto state when the object distance is 1000 mm.

As shown in FIGS. 1-6, the zoom lens assembly may include, sequentially from an object side to an image side, a first lens group G1 (a first lens E1 and a second lens E2), a stop STO, a second lens group G2 (a third lens E3, a fourth lens E4 and a fifth lens E5), a third lens group G3 (a sixth lens E6), a fourth lens group G4 (a seventh lens E7 and an eighth lens E8), an optical filter E9 and an image plane S19.

lens E8 is a convex surface, and an image-side surface S16 of the eighth lens E8 is a concave surface. The optical filter E9 has an object-side surface S17 and an image-side surface S18. Light from a photographed object sequentially passes through the surfaces S1-S18 and finally forms an image on the image plane S19.

Table 1 shows basic parameters of the zoom lens assembly in Embodiment 1. Here, the units of a radius of curvature, a thickness/distance and a focal length are millimeters (mm).

TABLE 1

| Surface Number | Surface Type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| S1 | aspheric | 84.8591 | 1.6640 | 1.55 | 56.1 | −16.04 | −99.0000 |
| S2 | aspheric | 7.8889 | 0.0221 | | | | 5.8403 |
| S3 | aspheric | 4.2015 | 1.3390 | 1.68 | 19.2 | 67.62 | −3.0413 |
| S4 | aspheric | 4.0291 | T1 | | | | −5.0999 |
| STO | spherical | infinite | −0.7666 | | | | |
| S5 | aspheric | 5.1034 | 1.4302 | 1.55 | 56.1 | 7.93 | −0.7484 |
| S6 | aspheric | −25.8892 | 0.0650 | | | | 46.0804 |
| S7 | aspheric | 36.6766 | 0.8224 | 1.68 | 19.2 | −12.88 | 79.9082 |
| S8 | aspheric | 6.9951 | 0.0650 | | | | 2.6837 |
| S9 | aspheric | 6.2149 | 2.3000 | 1.57 | 37.3 | 13.51 | 1.0913 |
| S10 | aspheric | 27.7258 | T2 | | | | 54.6197 |
| S11 | aspheric | −28.9767 | 0.4500 | 1.55 | 56.1 | −12.19 | 23.9248 |
| S12 | aspheric | 8.6931 | T3 | | | | −2.6156 |
| S13 | aspheric | 7.3823 | 2.3000 | 1.67 | 32.4 | −154.63 | −14.2294 |
| S14 | aspheric | 6.0299 | 0.6214 | | | | −12.9412 |
| S15 | aspheric | 5.8176 | 0.8734 | 1.70 | 30.1 | 15.80 | 0.9728 |
| S16 | aspheric | 11.3987 | T4 | | | | 4.2346 |
| S17 | spherical | infinite | 0.2100 | 1.52 | 64.2 | | |
| S18 | spherical | infinite | 2.1470 | | | | |
| S19 | spherical | infinite | | | | | |

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a concave surface. The sixth lens E6 has a negative refractive power, an object-side surface S11 of the sixth lens E6 is a concave surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. The eighth lens E8 has a positive refractive power, an object-side surface S15 of the eighth In this embodiment, by changing the positions of the second lens group, the third lens group and the fourth lens group on the optical axis, continuous focal length zooming of the zoom lens assembly can be achieved. In other words, by changing the spacing distance T1 between the first lens group and the second lens group on the optical axis (i.e., the spacing distance between the image-side surface of the second lens E2 and the object-side surface of the third lens E3 on the optical axis), the spacing distance T2 between the second lens group and the third lens group on the optical axis (i.e., the spacing distance between the image-side surface of the fifth lens E5 and the object-side surface of the sixth lens E6 on the optical axis), the spacing distance T3 between the third lens group and the fourth lens group on the optical axis (i.e., the spacing distance between the image-side surface of the sixth lens E6 and the object-side surface of the seventh lens E7 on the optical axis), and the spacing distance T4 between the fourth lens group and the optical filter on the optical axis (i.e., the spacing distance between the image-side surface of the eighth lens E8 and the object-side surface of the optical filter E9 on the optical axis), it is implemented that the zoom lens assembly switches from the wide-angle state to the telephoto state or from the telephoto state to the wide-angle state. Half of a maximal field-of-view HFOV, an F-number Fno and a total effective focal length f of the zoom lens assembly change as the zoom lens assembly switches from the wide-angle state to the telephoto state or switches from the telephoto state to the wide-angle state.

Table 2 is a table showing parameters changing with the state of the zoom lens assembly in Embodiment 1 when the object distance is infinite. Here, the units of T1, T2, T3, T4 and f are millimeters (mm), and the unit of HFOV is degrees (°).

object-side surface S1 of the first lens E1 to the image plane S19 of the zoom lens assembly) is 26.94 mm, and half of a diagonal length ImgH of an effective pixel area on the image plane S19 of the zoom lens assembly is 4.20 mm. An effective focal length fG1 of the first lens group G1 is −17.86 mm, an effective focal length fG2 of the second lens group G2 is 7.98 mm, an effective focal length fG3 of the third lens group G3 is −12.19 mm, and an effective focal length fG4 of the fourth lens group G4 is 20.43 mm.

TABLE 2

| Object Distance = infinite | T1 | T2 | T3 | T4 | HFOV | Fno | f |
|---|---|---|---|---|---|---|---|
| Wide-angle state | 6.2066 | 2.0042 | 1.2871 | 3.9014 | 33.6 | 3.21 | 13.91 |
| Intermediate state | 3.4858 | 2.9021 | 3.1100 | 3.9014 | 24.3 | 3.74 | 18.41 |
| Telephoto state | 1.5066 | 4.0887 | 3.9027 | 3.9014 | 20.4 | 4.22 | 23.03 |

Table 3 is a table showing parameters changing with the state of the zoom lens assembly in Embodiment 1 when the object distance is 1000 mm. Here, the units of T3 and T4 are both millimeters (mm). When the object distance is 1000 mm, T1, T2, HFOV, Fno and f are consistent with those shown in Table 2.

TABLE 3

| Object Distance = 1000 mm | T3 | T4 |
|---|---|---|
| Wide-angle state | 1.0269 | 4.1617 |
| Intermediate state | 2.6518 | 4.3597 |
| Telephoto state | 3.1859 | 4.6182 |

As can be seen from the data in Tables 2 and 3, the object distance is 1000 mm, and the fourth lens group G4 slightly moves toward left on the optical axis. The zoom lens assembly according to this embodiment may achieve continuous zooming the focal length from 13.91 mm to 23.03 mm.

In this example, a total track length TTL of the zoom lens assembly (i.e., a distance along the optical axis from the In Embodiment 1, the object-side surface and the image-side surface of any lens in the first to eighth lenses E1-E8 are both aspheric surfaces, and the surface type x of an aspheric lens may be defined using, but not limited to, the following formula:

$$x = \frac{ch^2}{1 + \sqrt{1 - (k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface. Table 4 shows the high-order coefficients A4, A6, A8, A10, A12, A14, A16, A18 and A20 applicable to the aspheric surfaces S1-S16 in Embodiment 1.

TABLE 4

| Surface Number | A4 | A6 | A8 | A10 | A12 |
|---|---|---|---|---|---|
| S1 | 4.1438E−03 | −4.1278E−04 | 2.3725E−05 | −1.2216E−06 | 1.7050E−07 |
| S2 | 5.7167E−03 | 2.6034E−04 | −5.1235E−04 | 1.8170E−04 | −4.4165E−05 |
| S3 | 4.0369E−04 | 4.2131E−04 | −2.6157E−04 | 6.4597E−05 | −8.8058E−06 |
| S4 | −3.5286E−04 | −2.1500E−04 | −7.3953E−06 | 9.5097E−06 | −2.0511E−06 |
| S5 | 7.2942E−04 | 5.7350E−05 | −3.1140E−05 | 8.7671E−06 | −1.4496E−06 |
| S6 | −1.1542E−03 | 1.3198E−04 | 2.7903E−06 | −3.0059E−06 | 7.2231E−07 |
| S7 | −2.6257E−03 | 9.8057E−05 | 3.8355E−05 | −1.3133E−05 | 2.9347E−06 |
| S8 | −2.2154E−03 | −5.1306E−04 | 1.1595E−04 | 3.6629E−06 | −1.7444E−06 |
| S9 | −5.0767E−04 | −5.5150E−04 | 7.1919E−05 | 2.9094E−05 | −8.0070E−06 |
| S10 | 2.6162E−03 | 1.4130E−04 | −3.2272E−05 | 1.8831E−05 | −4.0750E−06 |
| S11 | 1.5839E−03 | −1.7278E−03 | 1.2942E−03 | −7.0139E−04 | 2.4886E−04 |
| S12 | 2.0652E−03 | −1.7264E−03 | 1.2779E−03 | −6.8413E−04 | 2.3737E−04 |
| S13 | 2.7909E−03 | −3.0331E−04 | 6.3211E−05 | −1.5235E−05 | 2.6683E−06 |
| S14 | −1.5700E−03 | −3.3923E−04 | 1.4456E−04 | −3.3763E−05 | 5.2966E−06 |
| S15 | −5.0597E−03 | 2.1595E−04 | −1.0984E−04 | 3.7250E−05 | −6.3423E−06 |
| S16 | 1.2529E−03 | 1.4878E−04 | −2.1156E−04 | 7.2208E−05 | −1.2553E−05 |

| Surface Number | A14 | A16 | A18 | A20 |
|---|---|---|---|---|
| S1 | −2.7736E−08 | 2.4036E−09 | −9.7693E−11 | 1.3944E−12 |
| S2 | 7.6199E−06 | −8.8869E−07 | 6.1420E−08 | −1.8885E−09 |
| S3 | 6.3249E−07 | −1.8668E−08 | 0.0000E+00 | 0.0000E+00 |
| S4 | 1.9634E−07 | −7.3718E−09 | 0.0000E+00 | 0.0000E+00 |
| S5 | 1.1934E−07 | −4.5892E−09 | 0.0000E+00 | 0.0000E+00 |
| S6 | −8.9372E−08 | 3.9204E−09 | 0.0000E+00 | 0.0000E+00 |

TABLE 4-continued

| | | | | |
|---|---|---|---|---|
| S7 | −3.3262E−07 | 1.4996E−08 | 0.0000E+00 | 0.0000E+00 |
| S8 | −7.3109E−08 | 1.9337E−08 | 0.0000E+00 | 0.0000E+00 |
| S9 | 6.3143E−07 | −1.1065E−08 | 0.0000E+00 | 0.0000E+00 |
| S10 | 3.8869E−07 | −1.2249E−08 | 0.0000E+00 | 0.0000E+00 |
| S11 | −5.5547E−05 | 7.4491E−06 | −5.4513E−07 | 1.6639E−08 |
| S12 | −5.1614E−05 | 6.7484E−06 | −4.8322E−07 | 1.4519E−08 |
| S13 | −3.0185E−07 | 2.0784E−08 | −7.9329E−10 | 1.2846E−11 |
| S14 | −5.5165E−07 | 3.5956E−08 | −1.3292E−09 | 2.1265E−11 |
| S15 | 6.1433E−07 | −3.4770E−08 | 1.0591E−09 | −1.3648E−11 |
| S16 | 1.2735E−06 | −7.5466E−08 | 2.3777E−09 | −3.0238E−11 |

Figure 7A:
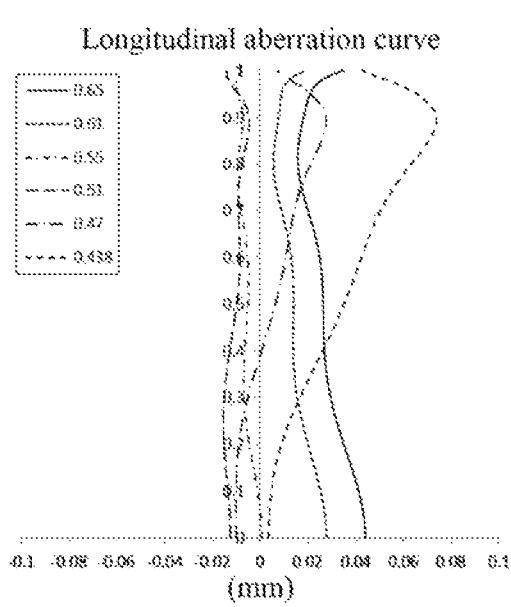
FIGS. 7A-7D respectively show a longitudinal aberration curve, an astigmatic curve, a distortion curve and a lateral color curve of the zoom lens assembly of Embodiment 1 which is in the wide-angle state.
Figure 7B:
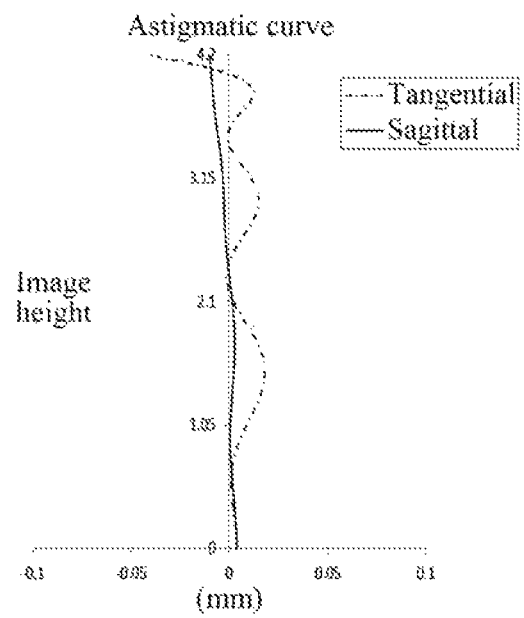
Figure 7C:
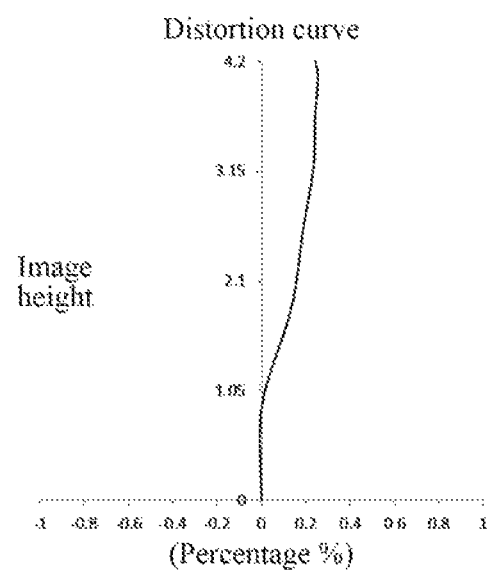
Figure 7D:
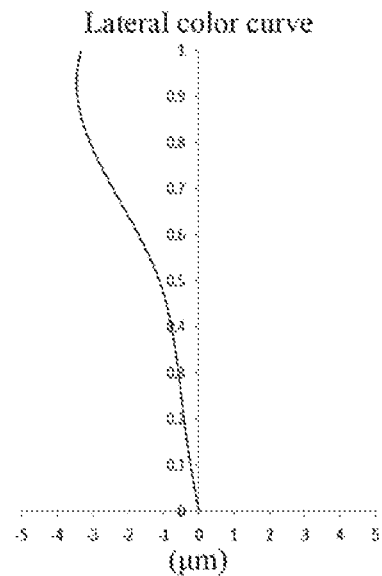
Figure 8A:
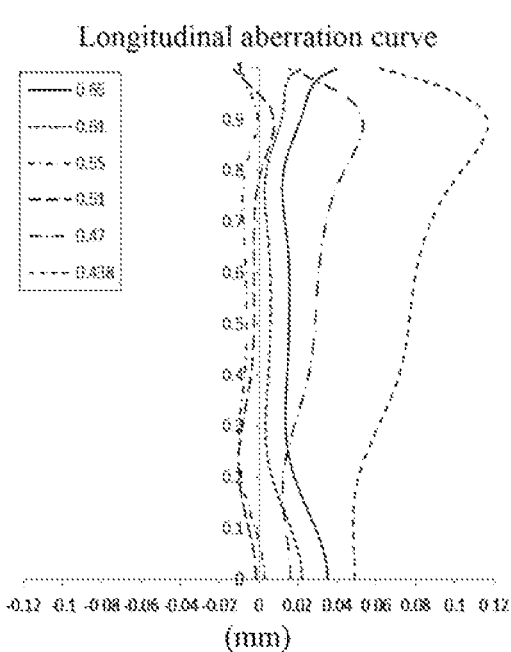
FIGS. 8A-8D respectively show a longitudinal aberration curve, an astigmatic curve, a distortion curve and a lateral color curve of the zoom lens assembly of Embodiment 1 which is in the intermediate state in the process of switching from the wide-angle state to the telephoto state.
Figure 8B:
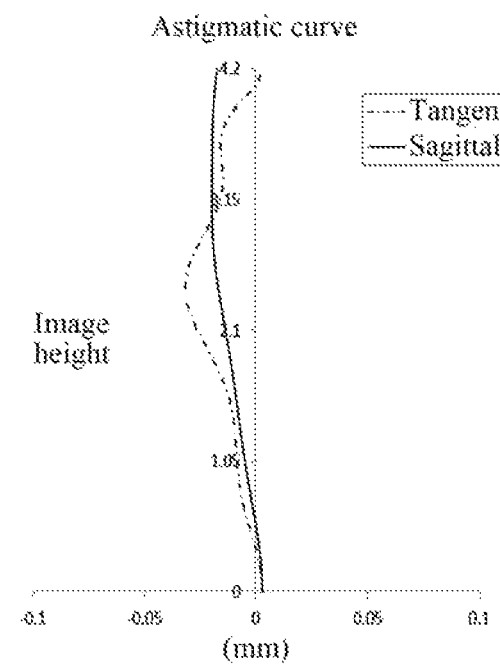
Figure 8C:
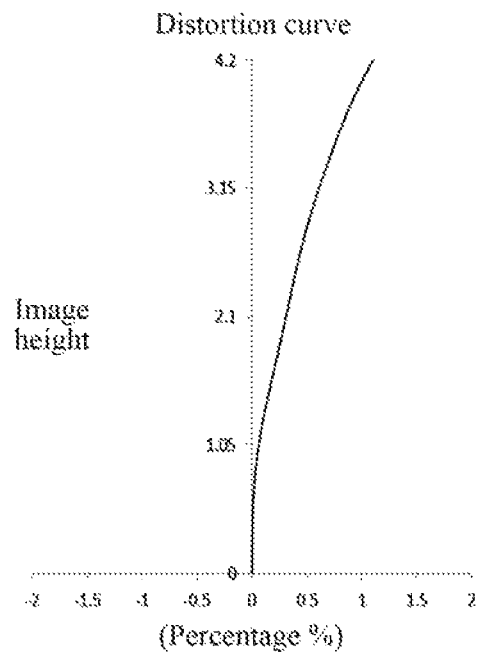
Figure 8D:
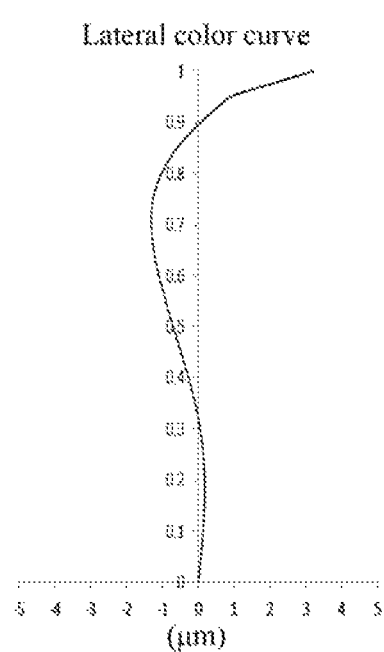
Figure 9A:
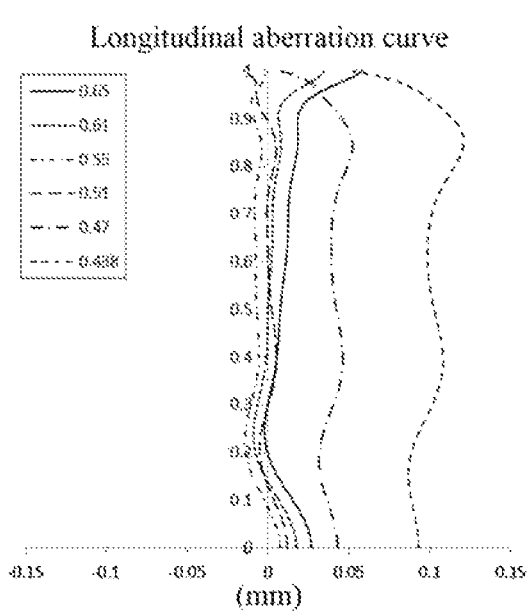
FIGS. 9A-9D respectively show a longitudinal aberration curve, an astigmatic curve, a distortion curve and a lateral color curve of the zoom lens assembly of Embodiment 1 which is in the telephoto state.
Figure 9B:
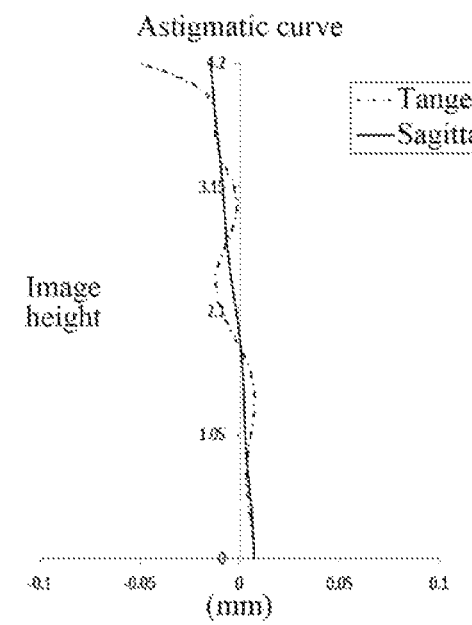
Figure 9C:
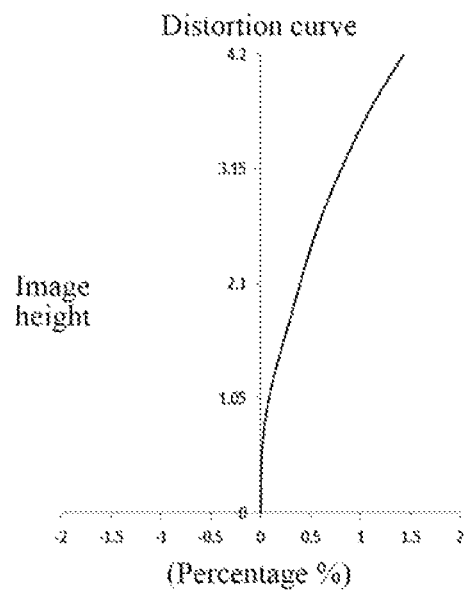
Figure 9D:
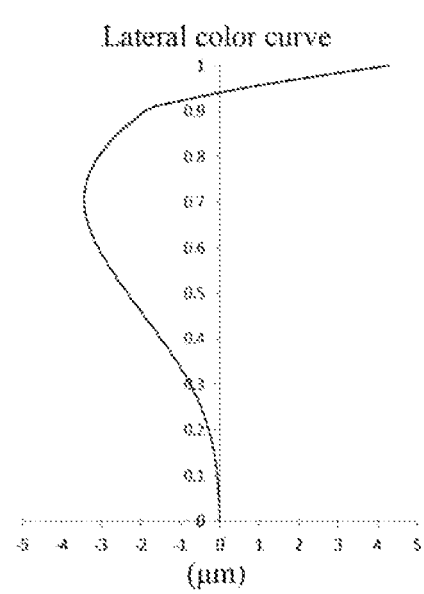

FIGS. 7A, 8A and 9A respectively illustrate longitudinal aberration curves of the zoom lens assembly of Embodiment 1 which is in the wide-angle state, the intermediate state and the telephoto state, representing deviations of focal points of light of different wavelengths converged after passing through the lens assembly. FIGS. 7B, 8B and 9B respectively illustrate astigmatic curves of the zoom lens assembly of Embodiment 1 which is in the wide-angle state, the intermediate state and the telephoto state, representing a curvature of a tangential image plane and a curvature of a sagittal image plane. FIGS. 7C, 8C and 9C respectively illustrate distortion curves of the zoom lens assembly of Embodiment 1 which is in the wide-angle state, the intermediate state and the telephoto state, representing amounts of distortion corresponding to different image heights. FIGS. 7D, 8D and 9D respectively illustrate lateral color curves of the zoom lens assembly of Embodiment 1 which is in the wide-angle state, the intermediate state and the telephoto state, representing deviations of different image heights on the image plane after light passes through the lens assembly. It can be seen from FIGS. 7A-9D that the zoom lens assembly given in Embodiment 1 can achieve a good imaging quality.

Embodiment 2

Figure 10:
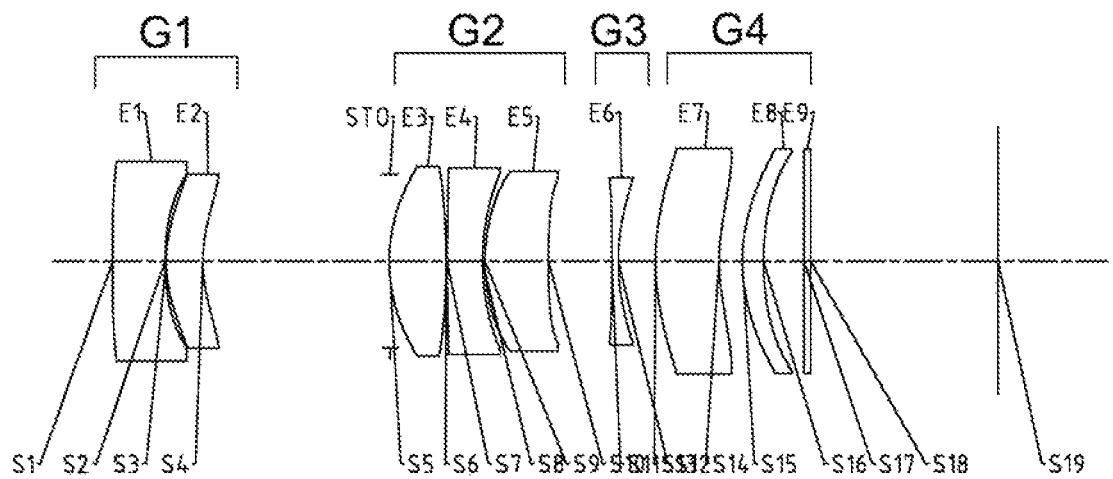
FIG. 10 is a schematic structural diagram of a zoom lens assembly according to Embodiment 2 of the present disclosure which is in the wide-angle state when the object distance is infinite.
Figure 11:
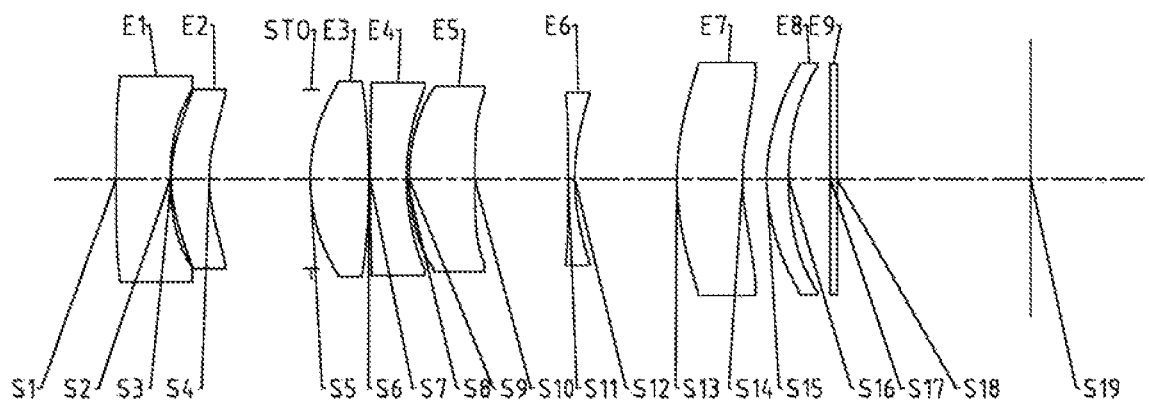
FIG. 11 is a schematic structural diagram of the zoom lens assembly according to Embodiment 2 of the present disclosure which is in the intermediate state in the process of switching from the wide-angle state to the telephoto state when the object distance is infinite.
Figure 12:
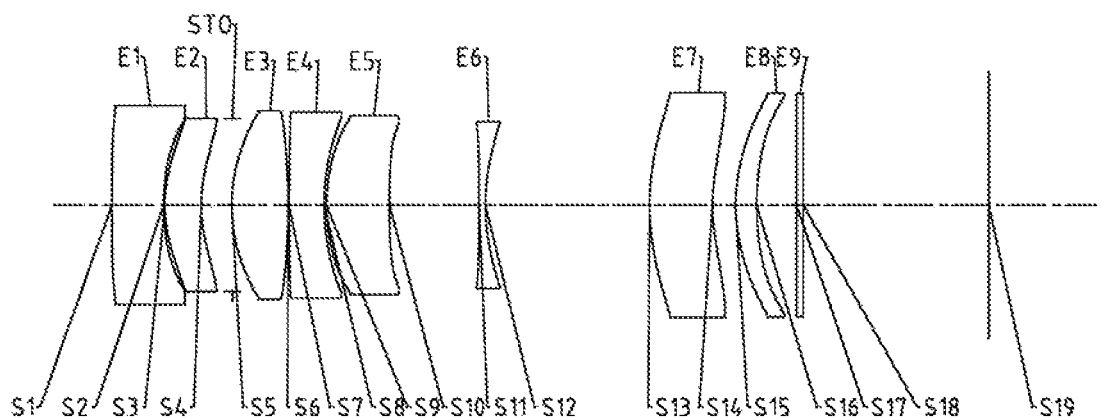
FIG. 12 is a schematic structural diagram of the zoom lens assembly according to Embodiment 2 of the present disclosure which is in the telephoto state when the object distance is infinite.

A zoom lens assembly according to Embodiment 2 of the present disclosure is described below with reference to FIGS. 10-15D. In this embodiment and the following embodiments, for the sake of brevity, some descriptions similar to those in Embodiment 1 will be omitted. FIG. 10 is a schematic structural diagram of the zoom lens assembly according to Embodiment 2 of the present disclosure which is in a wide-angle state when an object distance is infinite. FIG. 11 is a schematic structural diagram of the zoom lens assembly according to Embodiment 2 of the present disclosure which is in an intermediate state in a process of switching from the wide-angle state to a telephoto state when the object distance is infinite. FIG. 12 is a schematic structural diagram of the zoom lens assembly according to Embodiment 2 of the present disclosure which is in the telephoto state when the object distance is infinite.

As shown in FIGS. 10-12, the zoom lens assembly may include, sequentially from an object side to an image side, a first lens group G1 (a first lens E1 and a second lens E2), a stop STO, a second lens group G2 (a third lens E3, a fourth lens E4 and a fifth lens E5), a third lens group G3 (a sixth lens E6), a fourth lens group G4 (a seventh lens E7 and an eighth lens E8), an optical filter E9 and an image plane S19.

The first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a concave surface. The sixth lens E6 has a negative refractive power, an object-side surface S11 of the sixth lens E6 is a concave surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. The eighth lens E8 has a positive refractive power, an object-side surface S15 of the eighth lens E8 is a convex surface, and an image-side surface S16 of the eighth lens E8 is a concave surface. The optical filter E9 has an object-side surface S17 and an image-side surface S18. Light from a photographed object sequentially passes through the surfaces S1-S18 and finally forms an image on the image plane S19.

In this embodiment, a total track length TTL of the zoom lens assembly is 27.86 mm, and half of a diagonal length ImgH of an effective pixel area on the image plane S19 of the zoom lens assembly is 4.20 mm. An effective focal length fG1 of the first lens group G1 is −17.48 mm, an effective focal length fG2 of the second lens group G2 is 8.13 mm, an effective focal length fG3 of the third lens group G3 is −12.04 mm, and an effective focal length fG4 of the fourth lens group G4 is 21.88 mm.

Table 5 shows basic parameters of the zoom lens assembly in Embodiment 2. Here, the units of a radius of curvature, a thickness/distance and a focal length are millimeters (mm).

TABLE 5

| Surface Number | Surface Type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| S1 | aspheric | −80.0000 | 1.6491 | 1.55 | 56.1 | −14.70 | 74.5607 |
| S2 | aspheric | 8.9889 | 0.0300 | | | | 8.0118 |
| S3 | aspheric | 4.4475 | 1.1559 | 1.68 | 19.2 | 56.43 | −3.6417 |
| S4 | aspheric | 4.5032 | T1 | | | | −6.1019 |
| STO | spherical | infinite | −0.0300 | | | | |
| S5 | aspheric | 5.3925 | 1.7902 | 1.55 | 56.1 | 8.37 | −0.8636 |
| S6 | aspheric | −26.5371 | 0.0300 | | | | 28.3545 |
| S7 | aspheric | 39.5126 | 1.1135 | 1.68 | 19.2 | −12.46 | 89.4892 |
| S8 | aspheric | 6.8845 | 0.0776 | | | | 2.6116 |
| S9 | aspheric | 5.9462 | 2.0000 | 1.57 | 37.3 | 12.04 | 1.2621 |
| S10 | aspheric | 38.6042 | T2 | | | | 51.6457 |
| S11 | aspheric | −162.8769 | 0.2000 | 1.55 | 56.1 | −12.04 | −99.0000 |
| S12 | aspheric | 6.8563 | T3 | | | | −2.9994 |
| S13 | aspheric | 7.7447 | 2.0000 | 1.66 | 34.4 | −71.84 | −15.9299 |
| S14 | aspheric | 5.9737 | 0.7317 | | | | −11.7486 |
| S15 | aspheric | 5.2883 | 0.6711 | 1.75 | 33.2 | 15.11 | 0.7899 |
| S16 | aspheric | 9.3200 | T4 | | | | 4.0322 |
| S17 | spherical | infinite | 0.2100 | 1.52 | 64.2 | | |
| S18 | spherical | infinite | 5.8979 | | | | |
| S19 | spherical | infinite | | | | | |

In this embodiment, by changing the positions of the second lens group, the third lens group and the fourth lens group on the optical axis, continuous zooming of the focal length of the zoom lens assembly can be achieved. In other words, by changing the spacing distance T1 between the first lens group and the second lens group on the optical axis (i.e., the spacing distance between the image-side surface of the second lens E2 and the object-side surface of the third lens E3 on the optical axis), the spacing distance T2 between the second lens group and the third lens group on the optical axis (i.e., the spacing distance between the image-side surface of the fifth lens E5 and the object-side surface of the sixth lens E6 on the optical axis), the spacing distance T3 between the third lens group and the fourth lens group on the optical axis (i.e., the spacing distance between the image-side surface of the sixth lens E6 and the object-side surface of the seventh lens E7 on the optical axis), and the spacing distance T4 between the fourth lens group and the optical filter on the optical axis (i.e., the spacing distance between the image-side surface of the eighth lens E8 and the object-side surface of the optical filter E9 on the optical axis), it is implemented that the zoom lens assembly switches from the wide-angle state to the telephoto state or switches from the telephoto state to the wide-angle state. Half of a maximal field-of-view HFOV, an F-number Fno and a total effective focal length f of the zoom lens assembly change as the zoom lens assembly switches from the wide-angle state to the telephoto state or switches from the telephoto state to the wide-angle state.

Table 6 is a table showing parameters changing with the state of the zoom lens assembly in Embodiment 2 when the object distance is infinite. Here, the units of T1, T2, T3, T4 and f are millimeters (mm), and the unit of HFOV is degrees (°).

TABLE 6

| Object Distance = infinite | T1 | T2 | T3 | T4 | HFOV | Fno | f |
|---|---|---|---|---|---|---|---|
| Wide-angle state | 5.8966 | 1.9957 | 1.1713 | 1.2703 | 33.8 | 3.30 | 13.90 |
| Intermediate state | 3.1060 | 2.8477 | 3.1100 | 1.2703 | 25.9 | 3.81 | 18.30 |
| Telephoto state | 1.0004 | 4.0030 | 4.0603 | 1.2703 | 20.7 | 4.28 | 23.00 |

Table 7 is a table showing parameters changing with the state of the zoom lens assembly in Embodiment 2 when the object distance is 1000 mm. Here, the units of T3 and T4 are both millimeters (mm). When the object distance is 1000 mm, T1, T2, HFOV, Fno and f are consistent with those shown in Table 6.

TABLE 7

| Object Distance = 1000 mm | T3 | T4 |
|---|---|---|
| Wide-angle state | 1.2957 | 1.4299 |
| Intermediate state | 2.8381 | 1.6783 |
| Telephoto state | 3.8794 | 1.8530 |

As can be seen from the data in Tables 6 and 7, the object distance is 1000 mm, and the fourth lens group G4 slightly moves towards left on the optical axis. The zoom lens assembly according to this embodiment may achieve continuous zooming the focal length from 13.90 mm to 23.00 mm.

Table 8 shows the high-order coefficients A4, A6, A8, A10, A12, A14, A16, A18 and A20 applicable to the aspheric surfaces S1-S16 in Embodiment 2. Here, the surface type of each aspheric surface may be defined using, but not limited to, the formula (1) given in Embodiment 1.

TABLE 8

| Surface Number | A4 | A6 | A8 | A10 | A12 |
|---|---|---|---|---|---|
| S1 | 4.1827E−03 | −4.1381E−04 | 2.5238E−05 | −1.2144E−06 | 1.6538E−07 |
| S2 | 5.2648E−03 | 2.6566E−04 | −5.0665E−04 | 1.8137E−04 | −4.4142E−05 |
| S3 | 1.6538E−04 | 3.8122E−04 | −2.6397E−04 | 6.5151E−05 | −8.8201E−06 |
| S4 | −6.6615E−04 | −2.0705E−04 | −9.7377E−06 | 9.3379E−06 | −2.0202E−06 |
| S5 | 6.3238E−04 | 4.5952E−05 | −2.9580E−05 | 8.7510E−06 | −1.4408E−06 |
| S6 | −1.1031E−03 | 1.3679E−04 | 3.7390E−06 | −2.8681E−06 | 7.0274E−07 |
| S7 | −2.3748E−03 | 1.1254E−04 | 3.8580E−05 | −1.3422E−05 | 2.9256E−06 |
| S8 | −2.2335E−03 | −4.8958E−04 | 1.1856E−04 | 3.8891E−06 | −1.7455E−06 |
| S9 | −2.4306E−04 | −5.0977E−04 | 7.8150E−05 | 2.9652E−05 | −7.9547E−06 |
| S10 | 2.9201E−03 | 1.6442E−04 | −3.1708E−05 | 1.9470E−05 | −3.8947E−06 |
| S11 | 6.5606E−04 | −1.7609E−03 | 1.2988E−03 | −6.9988E−04 | 2.4887E−04 |
| S12 | 1.8743E−03 | −1.7783E−03 | 1.2894E−03 | −6.8346E−04 | 2.3724E−04 |
| S13 | 2.3067E−03 | −2.9534E−04 | 6.3873E−05 | −1.5264E−05 | 2.6636E−06 |
| S14 | −1.4830E−03 | −3.3428E−04 | 1.4374E−04 | −3.3792E−05 | 5.2954E−06 |
| S15 | −3.9163E−03 | 1.8268E−04 | −1.0870E−04 | 3.7085E−05 | −6.3438E−06 |
| S16 | 8.5324E−04 | 2.0723E−04 | −2.1696E−04 | 7.2321E−05 | −1.2541E−05 |

| Surface Number | A14 | A16 | A18 | A20 |
|---|---|---|---|---|
| S1 | −2.7596E−08 | 2.4263E−09 | −1.0124E−10 | 1.5443E−12 |
| S2 | 7.6269E−06 | −8.8878E−07 | 6.1298E−08 | −1.8799E−09 |
| S3 | 6.2589E−07 | −1.8073E−08 | 0.0000E+00 | 0.0000E+00 |
| S4 | 1.9433E−07 | −7.3528E−09 | 0.0000E+00 | 0.0000E+00 |
| S5 | 1.2149E−07 | −4.3470E−09 | 0.0000E+00 | 0.0000E+00 |
| S6 | −9.3435E−08 | 4.0379E−09 | 0.0000E+00 | 0.0000E+00 |
| S7 | −3.3405E−07 | 1.4192E−08 | 0.0000E+00 | 0.0000E+00 |
| S8 | −8.0127E−08 | 1.6140E−08 | 0.0000E+00 | 0.0000E+00 |
| S9 | 6.1930E−07 | −1.4018E−08 | 0.0000E+00 | 0.0000E+00 |
| S10 | 4.0096E−07 | −1.7338E−08 | 0.0000E+00 | 0.0000E+00 |
| S11 | −5.5572E−05 | 7.4462E−06 | −5.4513E−07 | 1.6713E−08 |
| S12 | −5.1639E−05 | 6.7486E−06 | −4.8247E−07 | 1.4469E−08 |
| S13 | −3.0198E−07 | 2.0799E−08 | −7.9151E−10 | 1.2724E−11 |
| S14 | −5.5156E−07 | 3.5980E−08 | −1.3277E−09 | 2.1129E−11 |
| S15 | 6.1471E−07 | −3.4780E−08 | 1.0555E−09 | −1.3471E−11 |
| S16 | 1.2725E−06 | −7.5564E−08 | 2.3778E−09 | −2.9790E−11 |

Figure 13A:
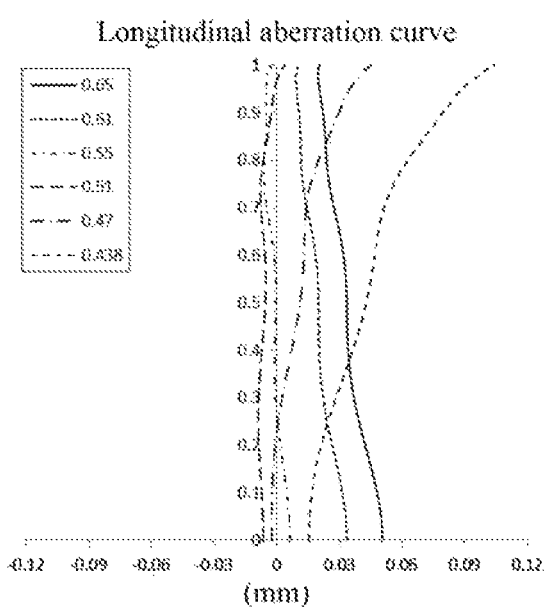
FIGS. 13A-13D respectively show a longitudinal aberration curve, an astigmatic curve, a distortion curve and a lateral color curve of the zoom lens assembly of Embodiment 2 which is in the wide-angle state.
Figure 13B:
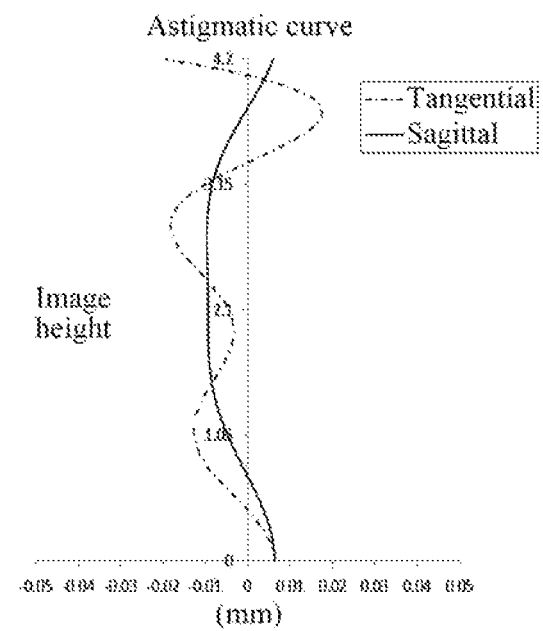
Figure 13C:
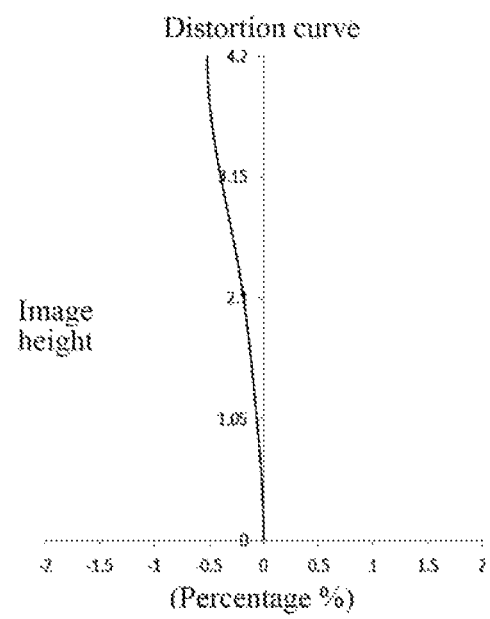
Figure 13D:
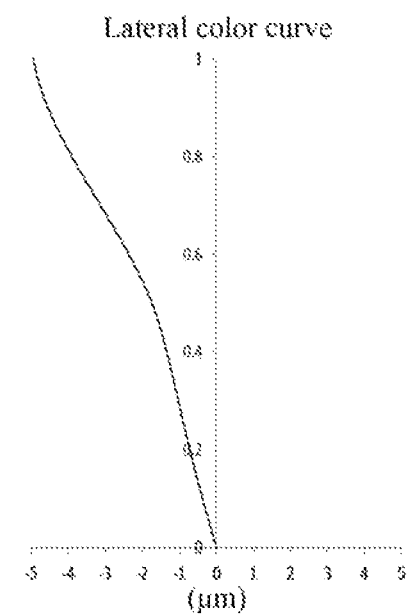
Figure 14A:
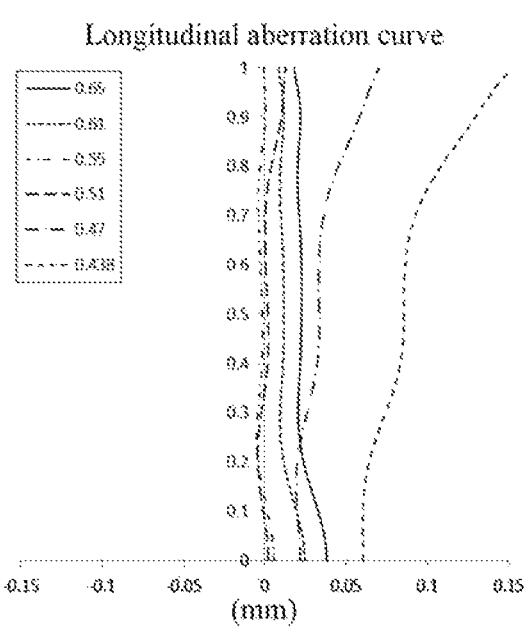
FIGS. 14A-14D respectively show a longitudinal aberration curve, an astigmatic curve, a distortion curve and a lateral color curve of the zoom lens assembly of Embodiment 2 which is in the intermediate state in the process of switching from the wide-angle state to the telephoto state.
Figure 14B:
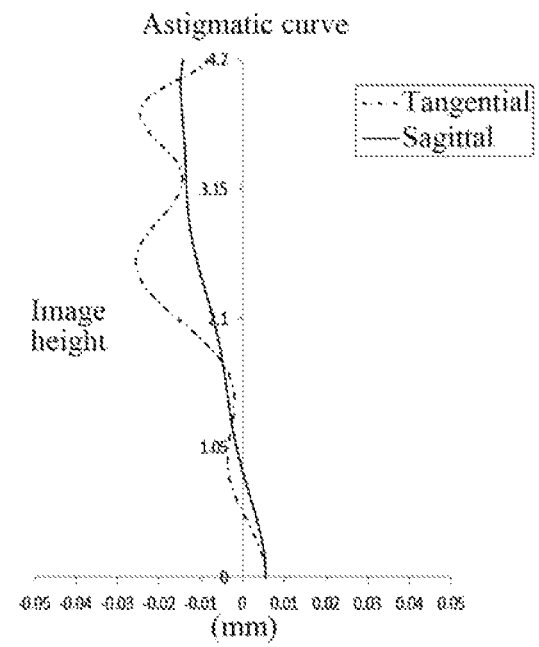
Figure 14C:
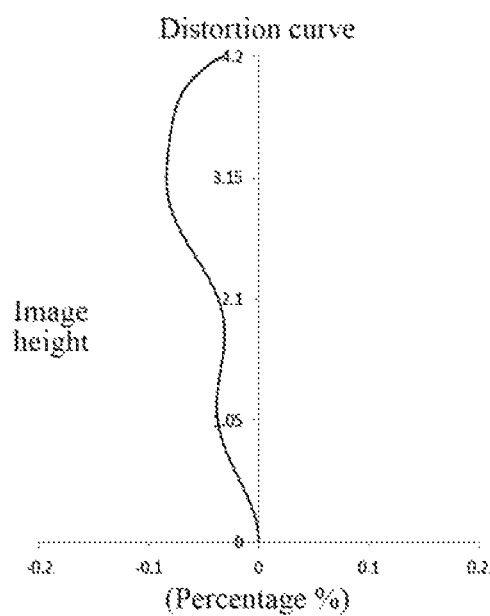
Figure 14D:
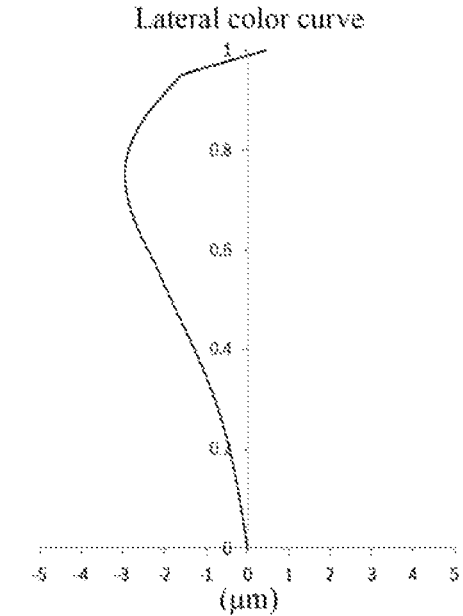
Figure 15A:
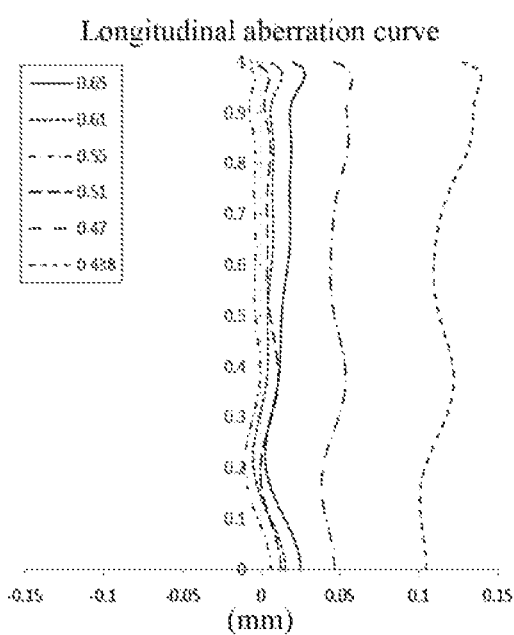
FIGS. 15A-15D respectively show a longitudinal aberration curve, an astigmatic curve, a distortion curve and a lateral color curve of the zoom lens assembly of Embodiment 2 which is in the telephoto state.
Figure 15B:
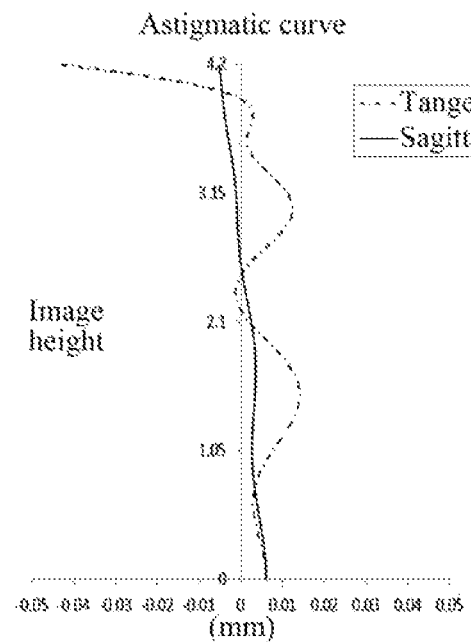
Figure 15C:
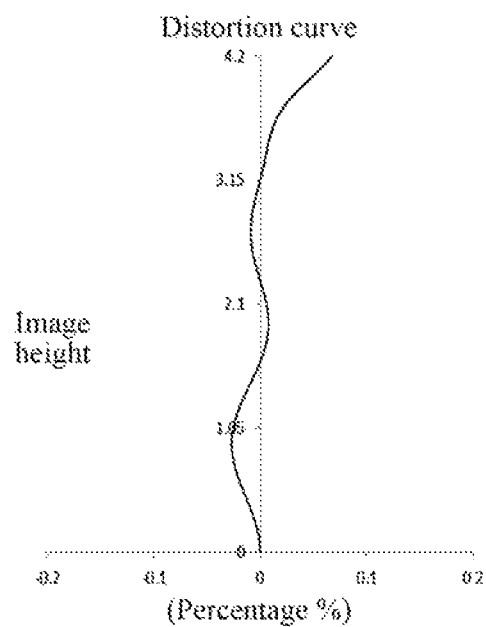
Figure 15D:
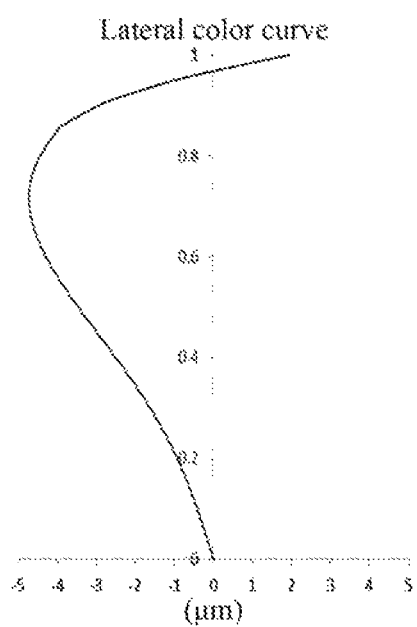

FIGS. 13A, 14A and 15A respectively illustrate longitudinal aberration curves of the zoom lens assembly of Embodiment 2 which is in the wide-angle state, the intermediate state and the telephoto state, representing deviations of focal points of light of different wavelengths converged after passing through the lens assembly. FIGS. 13B, 14B and 15B respectively illustrate astigmatic curves of the zoom lens assembly of Embodiment 2 which is in the wide-angle state, the intermediate state and the telephoto state, representing a curvature of a tangential image plane and a curvature of a sagittal image plane. FIGS. 13C, 14C and 15C respectively illustrate distortion curves of the zoom lens assembly of Embodiment 2 which is in the wide-angle state, the intermediate state and the telephoto state, representing amounts of distortion corresponding to different image heights. FIGS. 13D, 14D and 15D respectively illustrate lateral color curves of the zoom lens assembly of Embodiment 2 which is in the wide-angle state, the intermediate state and the telephoto state, representing deviations of different image heights on the image plane after light passes through the lens assembly. It can be seen from FIGS. 13A-15D that the zoom lens assembly given in Embodiment 2 can achieve a good imaging quality.

Embodiment 3

Figure 16:
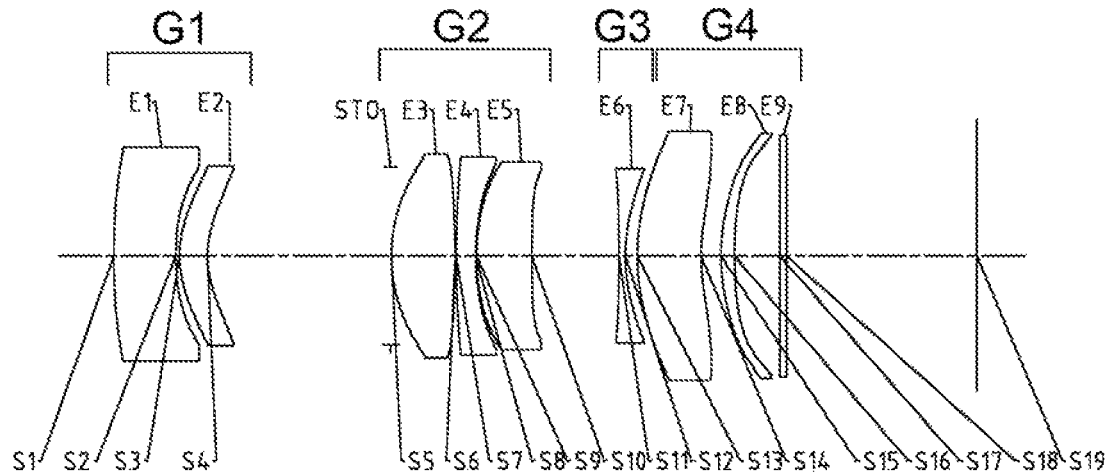
FIG. 16 is a schematic structural diagram of a zoom lens assembly according to Embodiment 3 of the present disclosure which is in the wide-angle state when the object distance is infinite.
Figure 17:
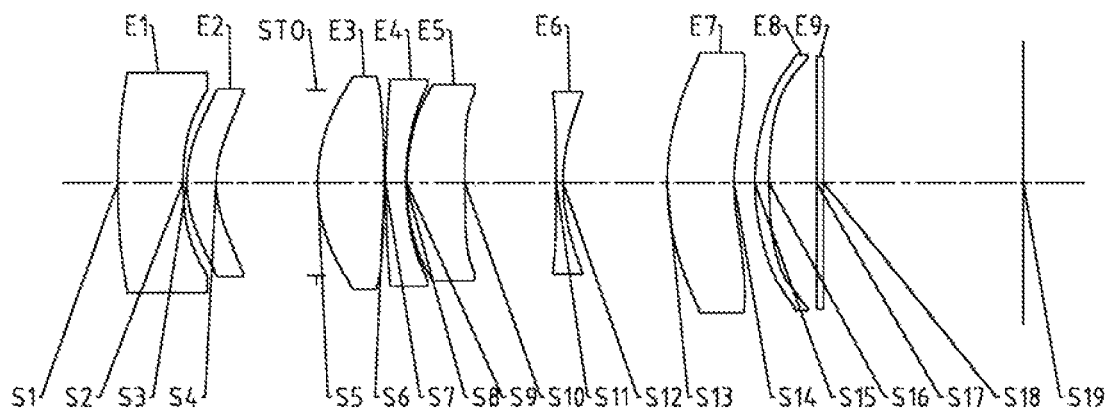
FIG. 17 is a schematic structural diagram of the zoom lens assembly according to Embodiment 3 of the present disclosure which is in the intermediate state in the process of switching from the wide-angle state to the telephoto state when the object distance is infinite.
Figure 18:
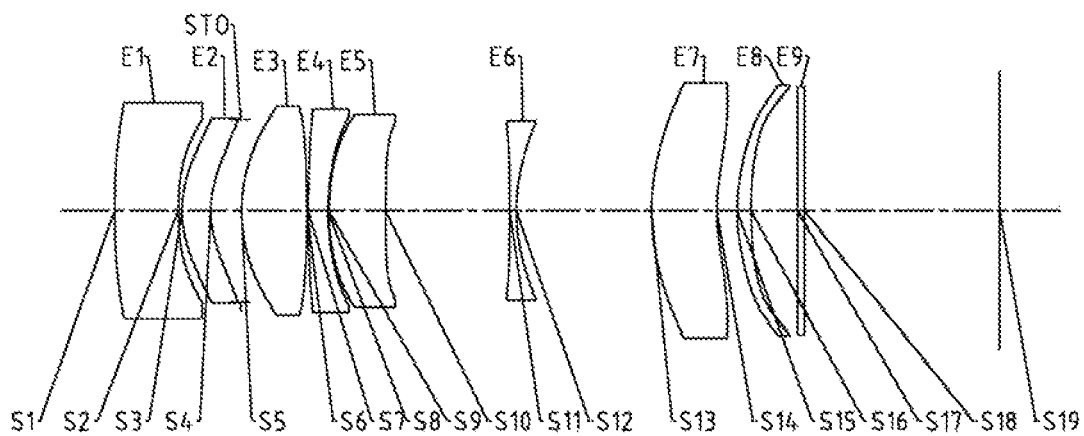
FIG. 18 is a schematic structural diagram of the zoom lens assembly according to Embodiment 3 of the present disclosure which is in the telephoto state when the object distance is infinite.

A zoom lens assembly according to Embodiment 3 of the present disclosure is described below with reference to FIGS. 16-21D. FIG. 16 is a schematic structural diagram of the zoom lens assembly according to Embodiment 3 of the present disclosure which is in a wide-angle state when an object distance is infinite. FIG. 17 is a schematic structural diagram of the zoom lens assembly according to Embodiment 3 of the present disclosure which is in an intermediate state in a process of switching from the wide-angle state to a telephoto state when the object distance is infinite. FIG. 18 is a schematic structural diagram of the zoom lens assembly according to Embodiment 3 of the present disclosure which is in the telephoto state when the object distance is infinite.

As shown in FIGS. 16-18, the zoom lens assembly may include, sequentially from an object side to an image side, a first lens group G1 (a first lens E1 and a second lens E2), a stop STO, a second lens group G2 (a third lens E3, a fourth lens E4 and a fifth lens E5), a third lens group G3 (a sixth lens E6), a fourth lens group G4 (a seventh lens E7 and an eighth lens E8), an optical filter E9 and an image plane S19.

The first lens E1 has a negative refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a concave surface. The sixth lens E6 has a negative refractive power, an object-side surface S11 of the sixth lens E6 is a concave surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. The eighth lens E8 has a positive refractive power, an object-side surface S15 of the eighth lens E8 is a convex surface, and an image-side surface S16 of the eighth lens E8 is a concave surface. The optical filter E9 has an object-side surface S17 and an image-side surface S18. Light from a photographed object sequentially passes through the surfaces S1-S18 and finally forms an image on the image plane S19.

In this example, a total track length TTL of the zoom lens assembly is 27.06 mm, and half of a diagonal length ImgH of an effective pixel area on the image plane S19 is 4.20 mm. An effective focal length fG1 of the first lens group G1 is −17.08 mm, an effective focal length fG2 of the second lens group G2 is 7.52 mm, an effective focal length fG3 of the third lens group G3 is −9.81 mm, and an effective focal length fG4 of the fourth lens group G4 is 17.98 mm.

Table 9 shows basic parameters of the zoom lens assembly in Embodiment 3. Here, the units of a radius of curvature, a thickness/distance and a focal length are millimeters (mm).

In this embodiment, by changing the positions of the second lens group, the third lens group and the fourth lens group on the optical axis, continuous zooming the focal length of the zoom lens assembly can be achieved. In other words, by changing the spacing distance T1 between the first lens group and the second lens group on the optical axis (i.e., the spacing distance between the image-side surface of the second lens E2 and the object-side surface of the third lens E3 on the optical axis), the spacing distance T2 between the second lens group and the third lens group on the optical axis (i.e., the spacing distance between the image-side surface of the fifth lens E5 and the object-side surface of the sixth lens E6 on the optical axis), the spacing distance T3 between the third lens group and the fourth lens group on the optical axis (i.e., the spacing distance between the image-side surface of the sixth lens E6 and the object-side surface of the seventh lens E7 on the optical axis), and the spacing distance T4 between the fourth lens group and the optical filter on the optical axis (i.e., the spacing distance between the image-side surface of the eighth lens E8 and the object-side surface of the optical filter E9 on the optical axis), it is implemented that the zoom lens assembly switches from the wide-angle state to the telephoto state or from the telephoto state to the wide-angle state. Half of a maximal field-of-view HFOV, an F-number Fno and a total effective focal length f of the zoom lens assembly change as the zoom lens assembly switches from the wide-angle state to the telephoto state or from the telephoto state to the wide-angle state.

Table 10 is a table showing parameters changing with the state of the zoom lens assembly in Embodiment 3 when the object distance is infinite. Here, the units of T1, T2, T3, T4 and f are millimeters (mm), and the unit of HFOV is degrees (°)..

TABLE 9

| Surface Number | Surface Type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| S1 | aspheric | 39.2385 | 1.9415 | 1.55 | 56.1 | −20.87 | −99.0000 |
| S2 | aspheric | 8.6809 | 0.1158 | | | | 7.3636 |
| S3 | aspheric | 3.4029 | 0.8752 | 1.68 | 19.2 | −200.00 | −3.0506 |
| S4 | aspheric | 2.9745 | T1 | | | | −3.7100 |
| STO | spherical | infinite | 0.0300 | | | | |
| S5 | aspheric | 4.9826 | 2.0000 | 1.55 | 56.1 | 8.25 | −0.7977 |
| S6 | aspheric | −40.3702 | 0.0300 | | | | 50.3616 |
| S7 | aspheric | 24.3366 | 0.6077 | 1.68 | 19.2 | −14.86 | 41.4744 |
| S8 | aspheric | 7.0581 | 0.0300 | | | | 2.8570 |
| S9 | aspheric | 6.6258 | 1.7343 | 1.57 | 37.3 | 12.38 | 1.5021 |
| S10 | aspheric | 96.4297 | T2 | | | | −90.1765 |
| S11 | aspheric | −105.9437 | 0.2000 | 1.55 | 56.1 | −9.81 | −99.0000 |
| S12 | aspheric | 5.6461 | T3 | | | | −2.5174 |
| S13 | aspheric | 6.6307 | 2.0000 | 1.56 | 45.9 | −552.82 | −11.8414 |
| S14 | aspheric | 5.7902 | 0.6205 | | | | −12.3413 |
| S15 | aspheric | 5.8791 | 0.4261 | 1.61 | 45.5 | 15.54 | 1.0573 |
| S16 | aspheric | 14.7917 | T4 | | | | 10.7271 |
| S17 | spherical | infinite | 0.2100 | 1.52 | 64.2 | | |
| S18 | spherical | infinite | 5.9691 | | | | |
| S19 | spherical | infinite | | | | | |

TABLE 10

| Object Distance = infinite | T1 | T2 | T3 | T4 | HFOV | Fno | f |
|---|---|---|---|---|---|---|---|
| Wide-angle state | 5.7394 | 1.9099 | 1.1972 | 1.4255 | 33.9 | 3.11 | 13.84 |
| Intermediate state | 3.0026 | 2.7339 | 3.1100 | 1.4255 | 26.0 | 3.56 | 18.20 |
| Telephoto state | 0.9171 | 3.7970 | 4.1325 | 1.4255 | 20.7 | 4.05 | 23.00 |

Table 11 is a table showing parameters corresponding to different states of the zoom lens assembly in Embodiment 3 when the object distance is 1000 mm. Here, the units of T3 and T4 are both millimeters (mm). When the object distance is 1000 mm, T1, T2, HFOV, Fno and f are consistent with those shown in Table 10.

Table 12 shows the high-order coefficients A4, A6, A8, A10, A12, A14, A16, A18 and A20 applicable to the aspheric surfaces S1-S16 in Embodiment 3. Here, the surface type of each aspheric surface may be defined using, but not limited to, the formula (1) given in Embodiment 1.

TABLE 12

| Surface Number | A4 | A6 | A8 | A10 | A12 |
|---|---|---|---|---|---|
| S1 | 3.6831E−03 | −3.6296E−04 | 2.1594E−05 | −1.3054E−06 | 1.7804E−07 |
| S2 | 6.4238E−03 | 1.6269E−04 | −5.0988E−04 | 1.8146E−04 | −4.4148E−05 |
| S3 | 8.3450E−04 | 3.9631E−04 | −2.6722E−04 | 6.4922E−05 | −8.7626E−06 |
| S4 | −2.3304E−04 | −2.0635E−04 | −7.1963E−06 | 9.6135E−06 | −2.0336E−06 |
| S5 | 6.7078E−04 | 5.8245E−05 | −3.0816E−05 | 8.7709E−06 | −1.4407E−06 |
| S6 | −1.3176E−03 | 1.2856E−04 | 4.4461E−06 | −2.9707E−06 | 7.1118E−07 |
| S7 | −2.5123E−03 | 1.1665E−04 | 4.0251E−05 | −1.3047E−05 | 2.9279E−06 |
| S8 | −1.7759E−03 | −4.5597E−04 | 1.2063E−04 | 4.1255E−06 | −1.6903E−06 |
| S9 | −7.8715E−05 | −4.7969E−04 | 8.3287E−05 | 2.9959E−05 | −8.0423E−06 |
| S10 | 2.8807E−03 | 1.8318E−04 | −2.7594E−05 | 1.8821E−05 | −3.9791E−06 |
| S11 | 5.3848E−04 | −1.8013E−03 | 1.3080E−03 | −7.0110E−04 | 2.4905E−04 |
| S12 | 1.8892E−03 | −1.8032E−03 | 1.2856E−03 | −6.8138E−04 | 2.3724E−04 |
| S13 | 2.8116E−03 | −2.9302E−04 | 6.2192E−05 | −1.5292E−05 | 2.6732E−06 |
| S14 | −2.5987E−03 | −3.3065E−04 | 1.4609E−04 | −3.3683E−05 | 5.2987E−06 |
| S15 | −4.3710E−03 | 2.5445E−04 | −1.0516E−04 | 3.7421E−05 | −6.3379E−06 |
| S16 | 2.2897E−03 | 2.2176E−04 | −2.1119E−04 | 7.2343E−05 | −1.2546E−05 |

| Surface Number | A14 | A16 | A18 | A20 |
|---|---|---|---|---|
| S1 | −2.6864E−08 | 2.3786E−09 | −1.0712E−10 | 1.8999E−12 |
| S2 | 7.6256E−06 | −8.8852E−07 | 6.1351E−08 | −1.8902E−09 |
| S3 | 6.3397E−07 | −1.9150E−08 | 0.0000E+00 | 0.0000E+00 |
| S4 | 1.9279E−07 | −7.1078E−09 | 0.0000E+00 | 0.0000E+00 |
| S5 | 1.2104E−07 | −4.3253E−09 | 0.0000E+00 | 0.0000E+00 |
| S6 | −9.2709E−08 | 3.6970E−09 | 0.0000E+00 | 0.0000E+00 |
| S7 | −3.3705E−07 | 1.3644E−08 | 0.0000E+00 | 0.0000E+00 |
| S8 | −7.9051E−08 | 1.3798E−08 | 0.0000E+00 | 0.0000E+00 |
| S9 | 6.1101E−07 | −1.3185E−08 | 0.0000E+00 | 0.0000E+00 |
| S10 | 4.2008E−07 | −1.5820E−08 | 0.0000E+00 | 0.0000E+00 |
| S11 | −5.5550E−05 | 7.4411E−06 | −5.4626E−07 | 1.6884E−08 |
| S12 | −5.1676E−05 | 6.7471E−06 | −4.8207E−07 | 1.4481E−08 |
| S13 | −3.0136E−07 | 2.0793E−08 | −7.9454E−10 | 1.2812E−11 |
| S14 | −5.5137E−07 | 3.5993E−08 | −1.3277E−09 | 2.0964E−11 |
| S15 | 6.1429E−07 | −3.4801E−08 | 1.0568E−09 | −1.3558E−11 |
| S16 | 1.2737E−06 | −7.5453E−08 | 2.3770E−09 | −3.0675E−11 |

TABLE 11

| Object Distance = 1000 mm | T3 | T4 |
|---|---|---|
| Wide-angle state | 1.1425 | 1.6271 |
| Intermediate state | 2.8831 | 1.8014 |
| Telephoto state | 4.0403 | 1.9785 |

As can be seen from the data in Tables 10 and 11, the object distance is 1000 mm, and the fourth lens group G4 slightly moves left on the optical axis. The zoom lens assembly according to this embodiment may achieve continuous focal length zooming from 13.84 mm to 23.00 mm.

Figures 20A, 20B:
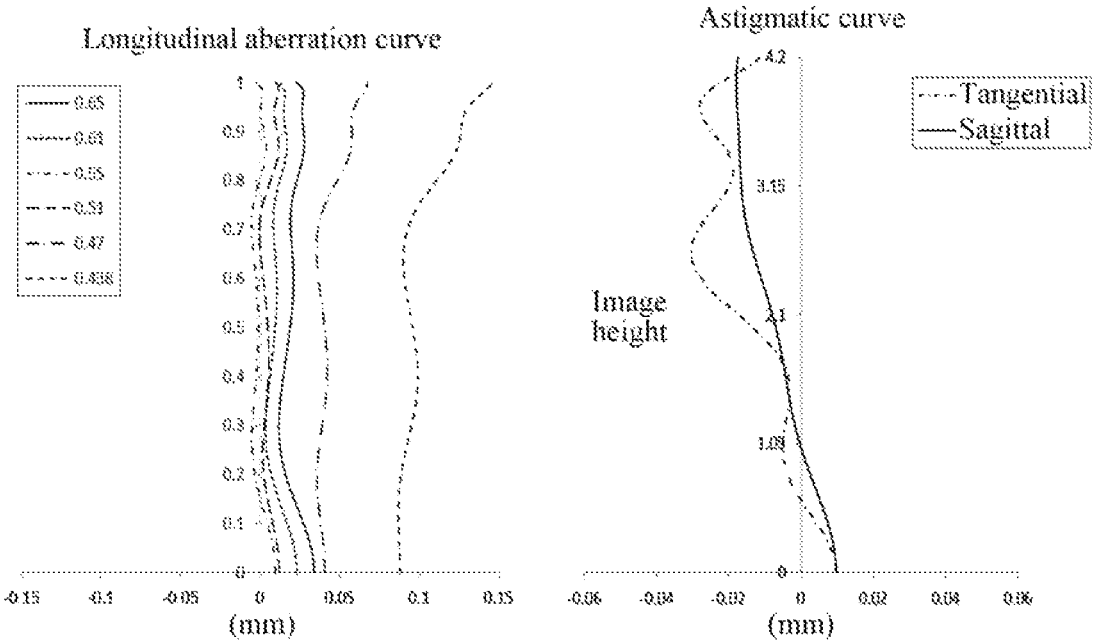
FIGS. 20A-20D respectively show a longitudinal aberration curve, an astigmatic curve, a distortion curve and a lateral color curve of the zoom lens assembly of Embodiment 3 which is in the intermediate state in the process of switching from the wide-angle state to the telephoto state.
Figures 20C, 20D:
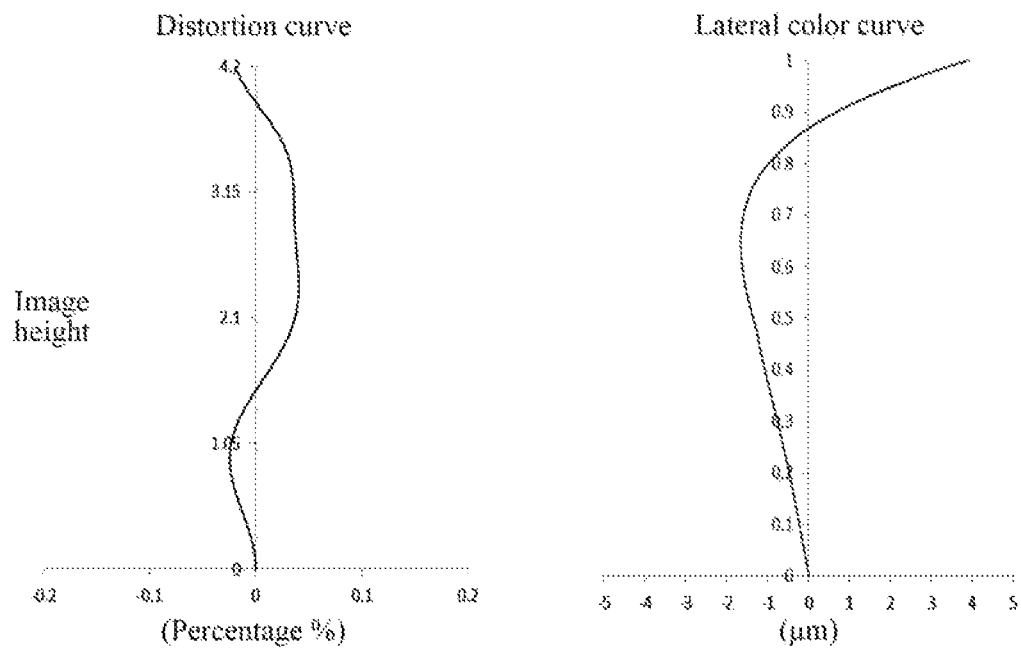
Figure 21A:
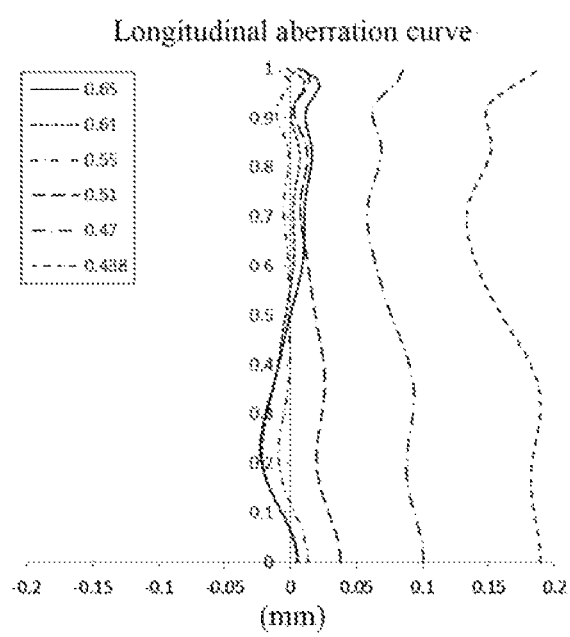
FIGS. 21A-21D respectively show a longitudinal aberration curve, an astigmatic curve, a distortion curve and a lateral color curve of the zoom lens assembly of Embodiment 3 which is in the telephoto state.
Figure 21B:
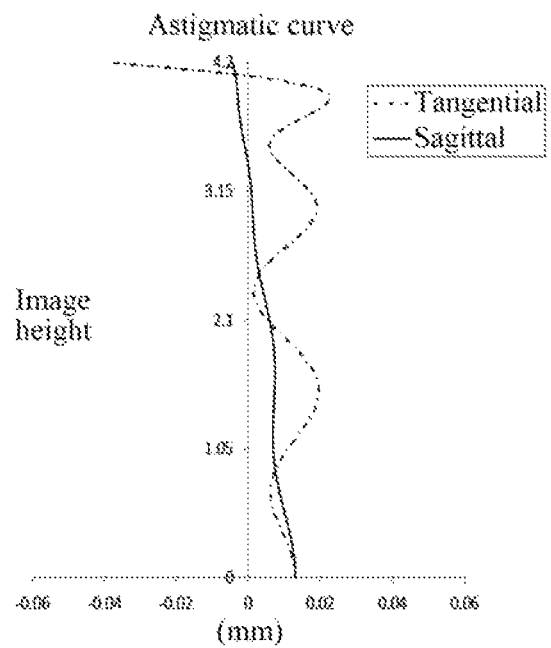
Figure 21C:
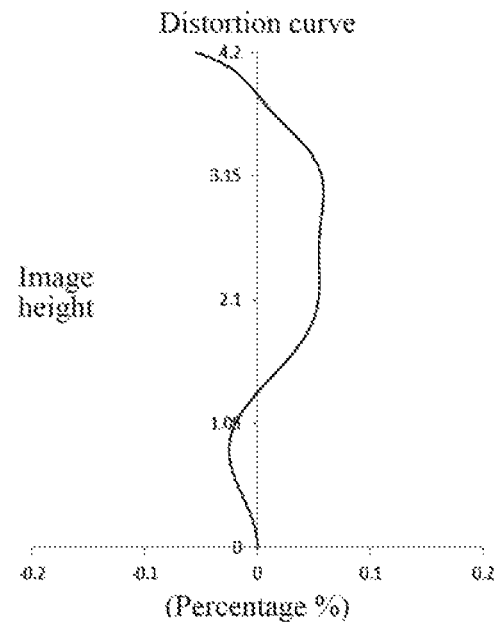
Figure 21D:
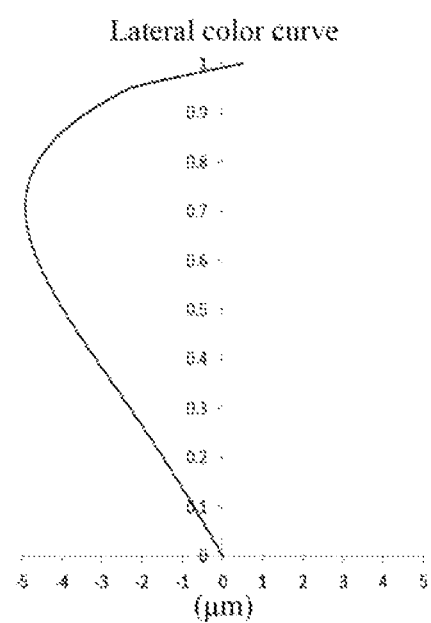

FIGS. 19A, 20A and 21A respectively illustrate longitudinal aberration curves of the zoom lens assembly of Embodiment 3 which is in the wide-angle state, the intermediate state and the telephoto state, representing deviations of focal points of light of different wavelengths converged after passing through the lens assembly. FIGS. 19B, 20B and 21B respectively illustrate astigmatic curves of the zoom lens assembly of Embodiment 3 which is in the wide-angle state, the intermediate state and the telephoto state, representing a curvature of a tangential image plane and a curvature of a sagittal image plane. FIGS. 19C, 20C and 21C respectively illustrate distortion curves of the zoom lens assembly of Embodiment 3 which is in the wide-angle state, the intermediate state and the telephoto state, representing amounts of distortion corresponding to different image heights. FIGS. 19D, 20D and 21D respectively illustrate lateral color curves of the zoom lens assembly of Embodiment 3 which is in the wide-angle state, the intermediate state and the telephoto state, representing deviations of different image heights on the image plane after light passes through the lens assembly. It can be seen from FIGS. 19A-21D that the zoom lens assembly given in Embodiment 3 can achieve a good imaging quality.

Embodiment 4

Figure 22:
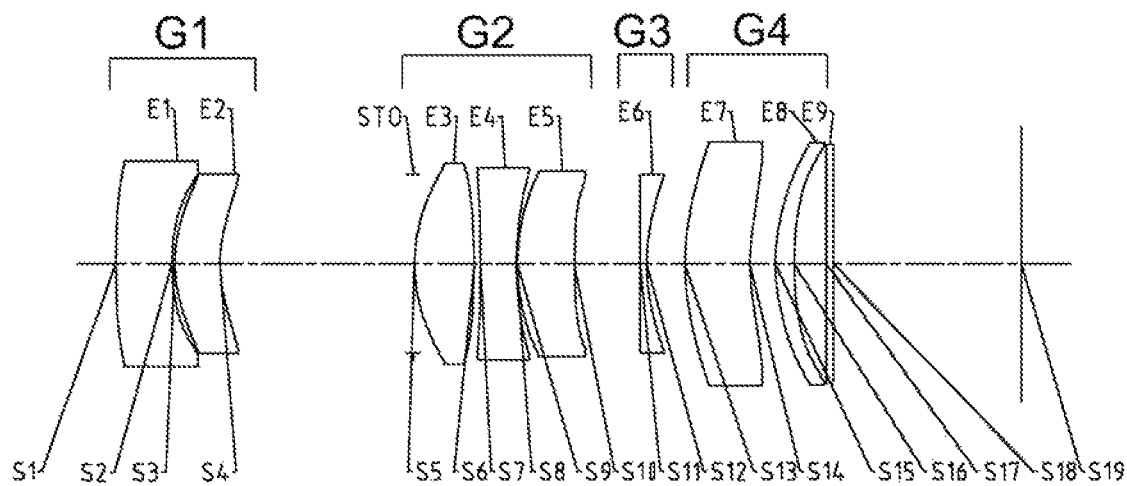
FIG. 22 is a schematic structural diagram of a zoom lens assembly according to Embodiment 4 of the present disclosure which is in the wide-angle state when the object distance is infinite.
Figure 23:
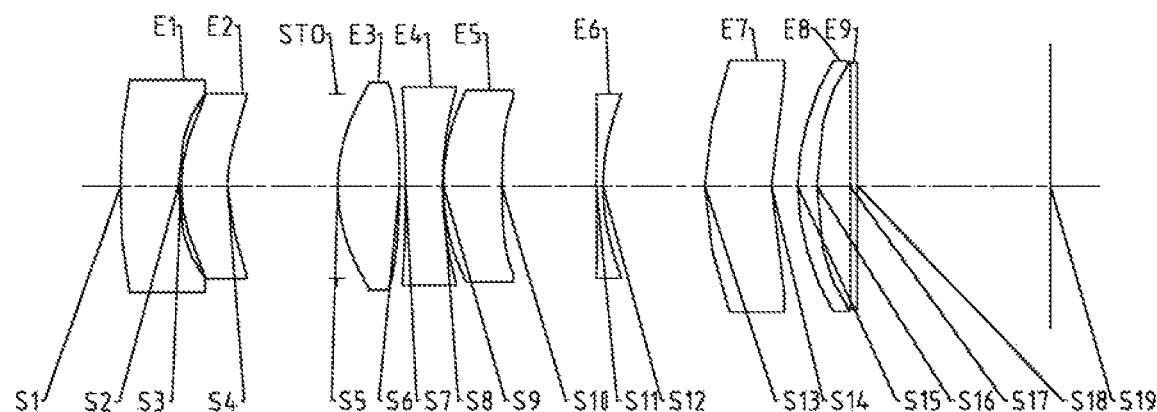
FIG. 23 is a schematic structural diagram of the zoom lens assembly according to Embodiment 4 of the present disclosure which is in the intermediate state in the process of switching from the wide-angle state to the telephoto state when the object distance is infinite.
Figure 24:
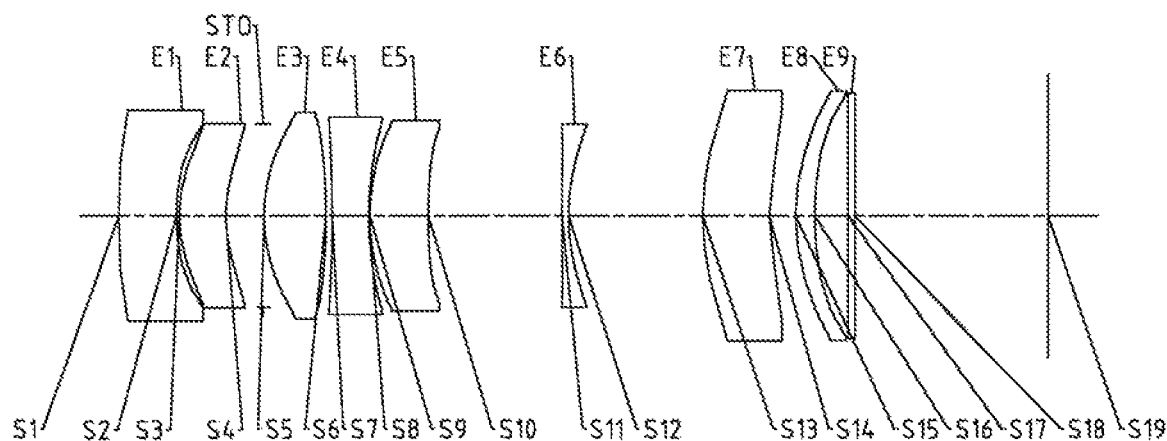
FIG. 24 is a schematic structural diagram of the zoom lens assembly according to Embodiment 4 of the present disclosure which is in the telephoto state when the object distance is infinite.

A zoom lens assembly according to Embodiment 4 of the present disclosure is described below with reference to FIGS. 22-27D. FIG. 22 is a schematic structural diagram of the zoom lens assembly according to Embodiment 4 of the present disclosure which is in a wide-angle state when an object distance is infinite. FIG. 23 is a schematic structural diagram of the zoom lens assembly according to Embodiment 4 of the present disclosure which is in an intermediate state in a process of switching from the wide-angle state to a telephoto state when the object distance is infinite. FIG. 24 is a schematic structural diagram of the zoom lens assembly according to Embodiment 4 of the present disclosure which is in the telephoto state when the object distance is infinite.

As shown in FIGS. 22-24, the zoom lens assembly may include, sequentially from an object side to an image side, a first lens group G1 (a first lens E1 and a second lens E2), a stop STO, a second lens group G2 (a third lens E3, a fourth lens E4 and a fifth lens E5), a third lens group G3 (a sixth lens E6), a fourth lens group G4 (a seventh lens E7 and an eighth lens E8), an optical filter E9 and an image plane S19.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a concave surface. The sixth lens E6 has a negative refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. The eighth lens E8 has a positive refractive power, an object-side surface S15 of the eighth lens E8 is a convex surface, and an image-side surface S16 of the eighth lens E8 is a concave surface. The optical filter E9 has an object-side surface S17 and an image-side surface S18. Light from a photographed object sequentially passes through the surfaces S1-S18 and finally forms an image on the image plane S19.

In this example, a total track length TTL of the zoom lens assembly is 27.90 mm, and half of a diagonal length ImgH of an effective pixel area on the image plane S19 of the zoom lens assembly is 4.20 mm. An effective focal length fG1 of the first lens group G1 is −18.14 mm, an effective focal length fG2 of the second lens group G2 is 8.21 mm, an effective focal length fG3 of the third lens group G3 is −12.97 mm, and an effective focal length fG4 of the fourth lens group G4 is 21.96 mm.

Table 13 shows basic parameters of the zoom lens assembly in Embodiment 4. Here, the units of a radius of curvature, a thickness/distance and a focal length are millimeters (mm).

TABLE 13

| Surface Number | Surface Type | Radius of curvature | Thickness/ Distance | Material Refractive index | Abbe number | Focal Length | Conic coefficient |
|---|---|---|---|---|---|---|---|
| OBJ | spherical | infinite | 0.1000 | | | | |
| S1 | aspheric | 70.9606 | 1.7275 | 1.55 | 56.1 | −16.38 | 79.6827 |
| S2 | aspheric | 7.8783 | 0.0300 | | | | 5.8943 |
| S3 | aspheric | 4.2095 | 1.3925 | 1.68 | 19.2 | 68.52 | −3.0817 |
| S4 | aspheric | 4.0095 | T1 | | | | −4.9880 |
| STO | spherical | infinite | 0.0300 | | | | |
| S5 | aspheric | 5.1558 | 1.8517 | 1.55 | 56.1 | 7.88 | −0.8288 |
| S6 | aspheric | −22.8244 | 0.1894 | | | | 34.1011 |
| S7 | aspheric | −80.0000 | 1.1004 | 1.68 | 19.2 | −12.57 | −99.0000 |
| S8 | aspheric | 9.6037 | 0.0300 | | | | 3.5786 |
| S9 | aspheric | 6.2729 | 1.7598 | 1.57 | 37.3 | 13.95 | 1.0616 |
| S10 | aspheric | 26.5198 | T2 | | | | 42.1726 |
| S11 | aspheric | 62.1913 | 0.2000 | 1.55 | 56.1 | −12.97 | −99.0000 |
| S12 | aspheric | 6.3536 | T3 | | | | −2.7451 |
| S13 | aspheric | 7.6971 | 2.0000 | 1.69 | 31.0 | −84.41 | −16.8017 |
| S14 | aspheric | 6.0780 | 0.7848 | | | | −13.7978 |
| S15 | aspheric | 5.8400 | 0.5790 | 1.75 | 28.0 | 15.66 | 1.1198 |
| S16 | aspheric | 11.0997 | T4 | | | | 6.0902 |
| S17 | spherical | infinite | 0.2100 | 1.52 | 64.2 | | |
| S18 | spherical | infinite | 5.7950 | | | | |
| S19 | spherical | infinite | | | | | | and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens In this embodiment, by changing the positions of the second lens group, the third lens group and the fourth lens group on the optical axis, continuous zooming of the focal length of the zoom lens assembly can be achieved. In other words, by changing the spacing distance T1 between the first lens group and the second lens group on the optical axis (i.e., the spacing distance between the image-side surface of the second lens E2 and the object-side surface of the third lens E3 on the optical axis), the spacing distance T2 between the second lens group and the third lens group on the optical axis (i.e., the spacing distance between the image-side surface of the fifth lens E5 and the object-side surface of the sixth lens E6 on the optical axis), the spacing distance T3 between the third lens group and the fourth lens group on the optical axis (i.e., the spacing distance between the image-side surface of the sixth lens E6 and the object-side surface of the seventh lens E7 on the optical axis), and the spacing distance T4 between the fourth lens group and the optical filter on the optical axis (i.e., the spacing distance between the image-side surface of the eighth lens E8 and the object-side surface of the optical filter E9 on the optical axis), it is implemented that the zoom lens assembly switches from the wide-angle state to the telephoto state or from the telephoto state to the wide-angle state. Half of a maximal field-of-view HFOV, an F-number Fno and a total effective focal length f of the zoom lens assembly change as the zoom lens assembly switches from the wide-angle state to the telephoto state or from the telephoto state to the wide-angle state.

Table 14 is a table showing parameters corresponding to different states of the zoom lens assembly in Embodiment 4 when the object distance is infinite. Here, the units of T1, T2, T3, T4 and f are millimeters (mm), and the unit of HFOV is degrees (°)..

TABLE 14

| Object Distance = infinite | T1 | T2 | T3 | T4 | HFOV | Fno | f |
|---|---|---|---|---|---|---|---|
| Wide-angle state | 6.0143 | 2.0253 | 1.1767 | 1.0002 | 33.7 | 3.15 | 13.87 |
| Intermediate state | 3.2792 | 2.8272 | 3.1100 | 1.0002 | 25.9 | 3.64 | 18.20 |
| Telephoto state | 1.1289 | 4.0083 | 4.0791 | 1.0002 | 46.0 | 4.10 | 23.00 |

Table 15 is a table showing parameters corresponding to different states of the zoom lens assembly in Embodiment 4 when the object distance is 1000 mm. Here, the units of T3 and T4 are both millimeters (mm). When the object distance is 1000 mm, T1, T2, HFOV, Fno and f are consistent with those shown in Table 14.

TABLE 15

| Object distance = 1000 mm | T3 | T4 |
|---|---|---|
| Wide-angle state | 1.3319 | 1.1475 |
| Intermediate state | 2.9057 | 1.3942 |
| Telephoto state | 3.8408 | 1.6049 |

As can be seen from the data in Tables 14 and 15, the object distance is 1000 mm, and the fourth lens group G4 slightly moves left on the optical axis. The zoom lens assembly according to this embodiment may achieve continuous zooming the focal length from 13.87 mm to 23.00 mm.

Table 16 shows the high-order coefficients A4, A6, A8, A10, A12, A14, A16, A18 and A20 applicable to the aspheric surfaces S1-S16 in Embodiment 4. Here, the surface type of each aspheric surface may be defined using, but not limited to, the formula (1) given in Embodiment 1.

TABLE 16

| Surface Number | A4 | A6 | A8 | A10 | A12 |
|---|---|---|---|---|---|
| S1 | 4.3287E−03 | −4.0120E−04 | 2.4118E−05 | −1.2808E−06 | 1.6813E−07 |
| S2 | 5.7531E−03 | 2.9305E−04 | −5.1002E−04 | 1.8159E−04 | −4.4166E−05 |
| S3 | 2.7175E−04 | 3.9593E−04 | −2.6185E−04 | 6.4908E−05 | −8.7838E−06 |
| S4 | −5.8879E−04 | −2.3674E−04 | −7.8003E−06 | 9.6172E−06 | −2.0387E−06 |
| S5 | 6.4212E−04 | 6.0929E−05 | −3.1840E−05 | 8.7652E−06 | −1.4442E−06 |
| S6 | −1.2510E−03 | 1.3966E−04 | 3.6164E−06 | −3.0410E−06 | 7.0912E−07 |
| S7 | −2.1995E−03 | 1.2839E−04 | 4.0205E−05 | −1.3017E−05 | 2.9214E−06 |
| S8 | −1.8756E−03 | −4.5292E−04 | 1.2329E−04 | 4.0765E−06 | −1.6834E−06 |
| S9 | −6.1213E−04 | −5.4603E−04 | 7.5391E−05 | 3.0057E−05 | −8.0076E−06 |
| S10 | 3.2192E−03 | 9.5552E−05 | −2.7734E−05 | 1.7133E−05 | −4.0959E−06 |
| S11 | 7.5299E−04 | −1.7581E−03 | 1.3019E−03 | −7.0142E−04 | 2.4889E−04 |
| S12 | 1.9203E−03 | −1.7522E−03 | 1.2843E−03 | −6.8335E−04 | 2.3721E−04 |
| S13 | 2.2534E−03 | −2.8735E−04 | 6.3436E−05 | −1.5276E−05 | 2.6677E−06 |
| S14 | −1.3570E−03 | −3.4548E−04 | 1.4418E−04 | −3.3734E−05 | 5.2993E−06 |
| S15 | −3.9325E−03 | 2.1059E−04 | −1.0875E−04 | 3.7294E−05 | −6.3420E−06 |
| S16 | 1.0805E−03 | 1.8575E−04 | −2.1200E−04 | 7.2199E−05 | −1.2551E−05 |

TABLE 16-continued

| Surface Number | A14 | A16 | A18 | A20 |
|---|---|---|---|---|
| S1 | −2.7434E−08 | 2.4227E−09 | −1.0025E−10 | 1.4493E−12 |
| S2 | 7.6231E−06 | −8.8834E−07 | 6.1421E−08 | −1.8956E−09 |
| S3 | 6.3160E−07 | −1.8755E−08 | 0.0000E+00 | 0.0000E+00 |
| S4 | 1.9410E−07 | −7.5262E−09 | 0.0000E+00 | 0.0000E+00 |
| S5 | 1.2018E−07 | −4.5082E−09 | 0.0000E+00 | 0.0000E+00 |
| S6 | −9.1734E−08 | 3.6859E−09 | 0.0000E+00 | 0.0000E+00 |
| S7 | −3.3783E−07 | 1.4082E−08 | 0.0000E+00 | 0.0000E+00 |
| S8 | −7.3445E−08 | 1.3856E−08 | 0.0000E+00 | 0.0000E+00 |
| S9 | 6.0868E−07 | −1.2871E−08 | 0.0000E+00 | 0.0000E+00 |
| S10 | 4.3981E−07 | −1.6381E−08 | 0.0000E+00 | 0.0000E+00 |
| S11 | −5.5549E−05 | 7.4459E−06 | −5.4561E−07 | 1.6771E−08 |
| S12 | −5.1644E−05 | 6.7498E−06 | −4.8240E−07 | 1.4466E−08 |
| S13 | −3.0173E−07 | 2.0788E−08 | −7.9345E−10 | 1.2886E−11 |
| S14 | −5.5145E−07 | 3.5971E−08 | −1.3285E−09 | 2.1182E−11 |
| S15 | 6.1439E−07 | −3.4767E−08 | 1.0588E−09 | −1.3692E−11 |
| S16 | 1.2736E−06 | −7.5459E−08 | 2.3772E−09 | −3.0448E−11 |

Figure 25A:
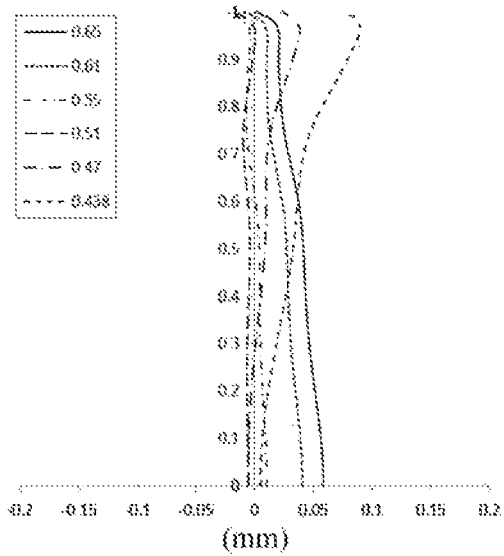
FIGS. 25A-25D respectively show a longitudinal aberration curve, an astigmatic curve, a distortion curve and a lateral color curve of the zoom lens assembly of Embodiment 4 which is in the wide-angle state.
Figure 25B:
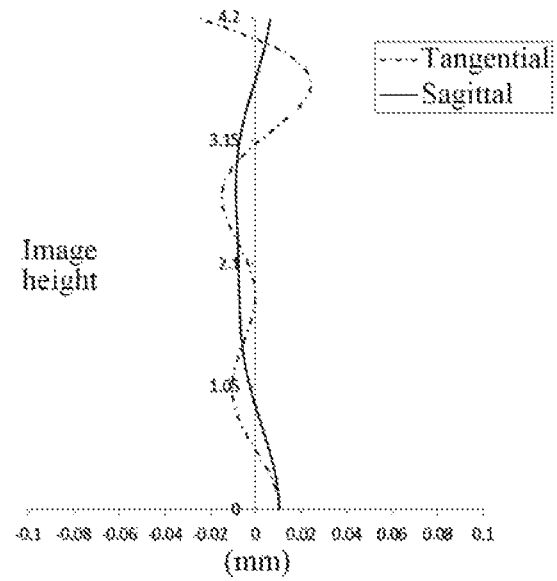
Figure 25C:
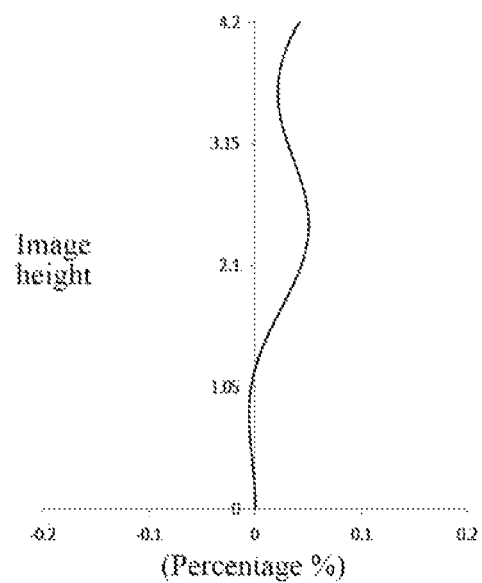
Figure 25D:
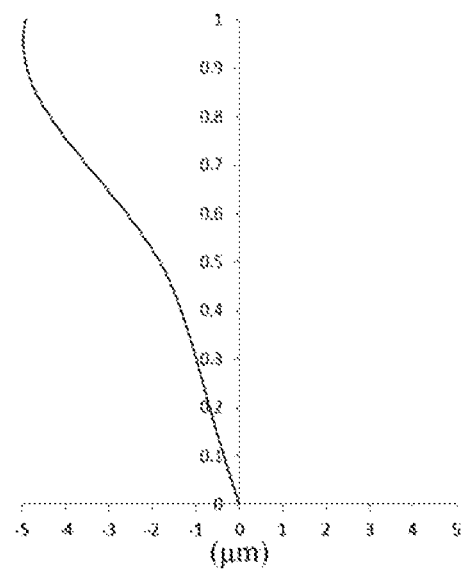
Figure 26A:
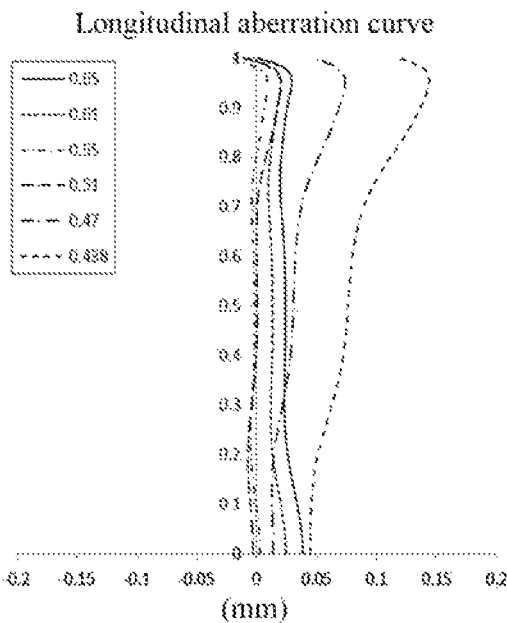
FIGS. 26A-26D respectively show a longitudinal aberration curve, an astigmatic curve, a distortion curve and a lateral color curve of the zoom lens assembly of Embodiment 4 which is in the intermediate state in the process of switching from the wide-angle state to the telephoto state.
Figure 26B:
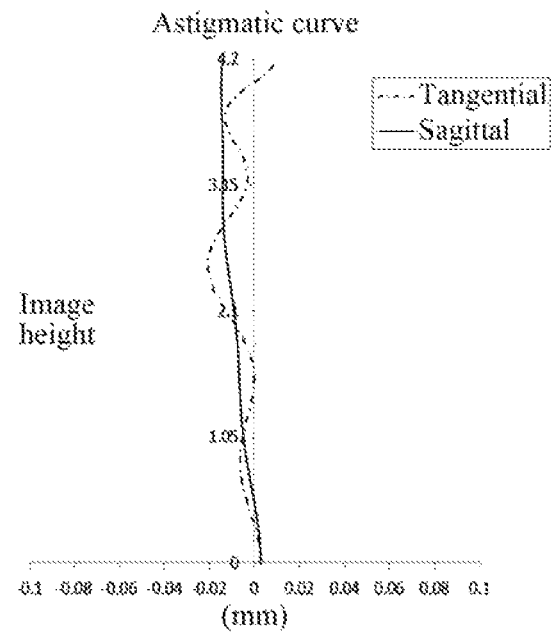
Figure 26C:
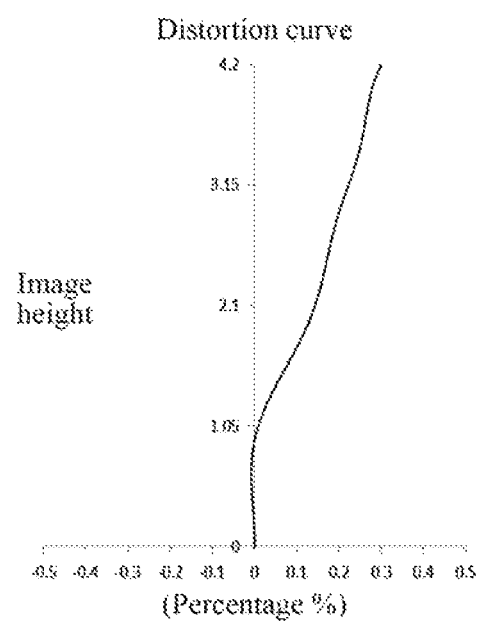
Figure 26D:
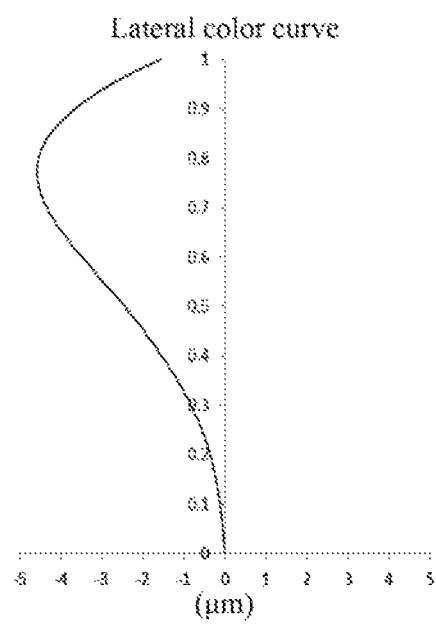
Figure 27A:
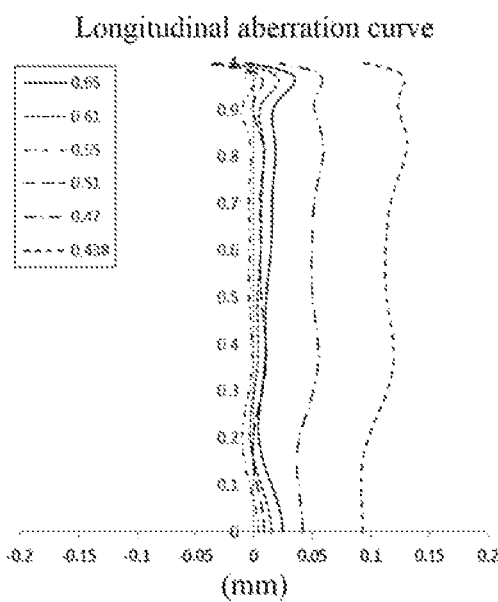
FIGS. 27A-27D respectively show a longitudinal aberration curve, an astigmatic curve, a distortion curve and a lateral color curve of the zoom lens assembly of Embodiment 4 which is in the telephoto state.
Figure 27B:
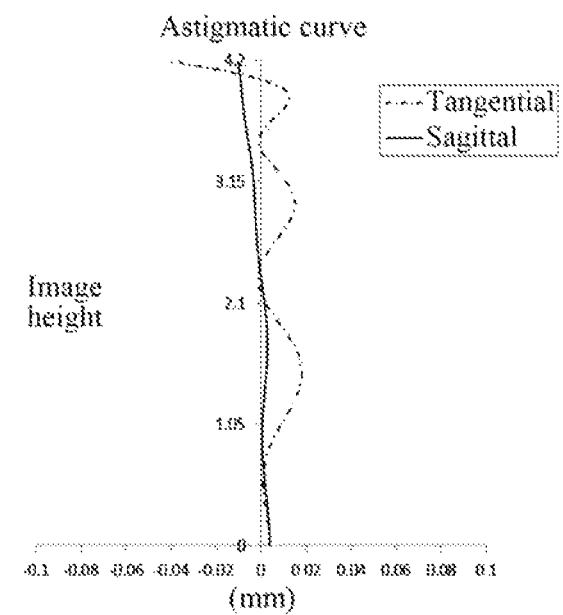
Figure 27C:
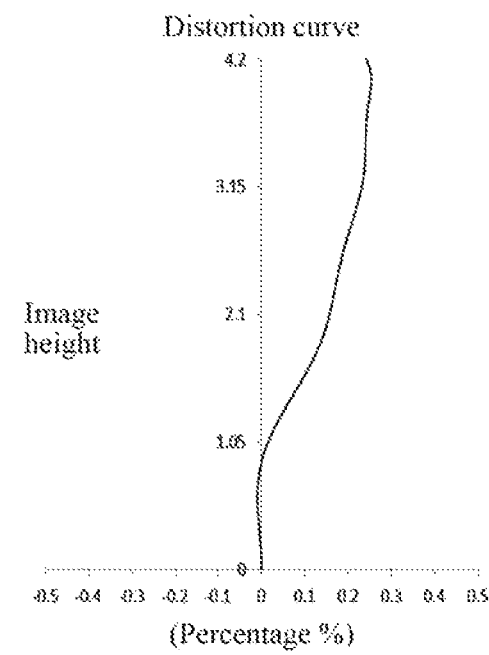
Figure 27D:
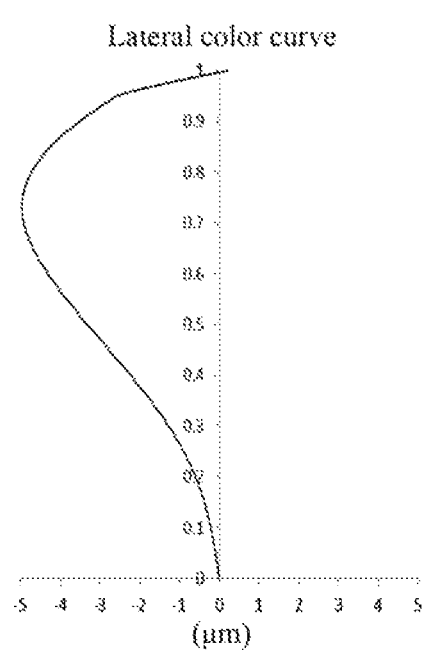

FIGS. 25A, 26A and 27A respectively illustrate longitudinal aberration curves of the zoom lens assembly of Embodiment 4 which is in the wide-angle state, the intermediate state and the telephoto state, representing deviations of focal points of light of different wavelengths converged after passing through the lens assembly. FIGS. 25B, 26B and 27B respectively illustrate astigmatic curves of the zoom lens assembly of Embodiment 4 which is in the wide-angle state, the intermediate state and the telephoto state, representing a curvature of a tangential image plane and a curvature of a sagittal image plane. FIGS. 25C, 26C and 27C respectively illustrate distortion curves of the zoom lens assembly of Embodiment 4 which is in the wide-angle state, the intermediate state and the telephoto state, representing amounts of distortion corresponding to different image heights. FIGS. 25D, 26D and 27D respectively illustrate lateral color curves of the zoom lens assembly of Embodiment 4 which is in the wide-angle state, the intermediate state and the telephoto state, representing deviations of different image heights on the image plane after light passes through the lens assembly. It can be seen from FIGS. 25A-27D that the zoom lens assembly given in Embodiment 4 can achieve a good imaging quality.

In summary, Embodiments 1-4 respectively satisfy the relationships shown in Table 17.

TABLE 17

| Conditional Expression | Embodiment | | | |
|---|---|---|---|---|
| | 1 | 2 | 3 | 4 |
| f3/fG2 | 0.99 | 1.03 | 1.10 | 0.96 |
| f1/fG1 | 0.90 | 0.84 | 1.22 | 0.90 |
| f4/f5 | −0.95 | −1.03 | −1.20 | −0.90 |
| R4/R5 | 0.79 | 0.84 | 0.60 | 0.78 |
| fG4/((fw + ft)/2) | 1.11 | 1.19 | 0.98 | 1.19 |
| TTL/ft | 1.17 | 1.21 | 1.18 | 1.21 |
| 10 × ΣATG2/TG2 | 0.28 | 0.22 | 0.14 | 0.45 |
| 100 × TG3/ΣCT | 4.03 | 1.89 | 2.04 | 1.88 |
| SAG71/SAG81 | 1.08 | 0.62 | 0.79 | 0.70 |
| SAG71/CT7 | 0.34 | 0.32 | 0.50 | 0.37 |
| CT1/ET1 | 0.75 | 0.75 | 0.82 | 0.77 |
| CT7/ET7 | 1.21 | 1.14 | 1.50 | 1.21 |
| DT81/ImgH | 0.83 | 0.84 | 0.91 | 0.89 |
| DTmax/Dtmin | 1.47 | 1.38 | 1.45 | 1.42 |
| ATG12/Δf | −0.52 | −0.54 | −0.53 | −0.54 |
| (R13 − R14)/(R13 + R14) | 0.10 | 0.13 | 0.07 | 0.12 |

The present disclosure further provides a camera apparatus having an electronic photosensitive element which may be a photosensitive charge-coupled device (CCD) or complementary metal-oxide semiconductor element (CMOS). The camera apparatus may be an independent camera device such as a digital camera, or may be a camera module integrated in a mobile electronic device such as a mobile phone. The camera apparatus is equipped with the zoom lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A zoom lens assembly, comprising, sequentially along an optical axis from an object side to an image side:
    a first lens group having a negative refractive power, comprising a first lens and a second lens;
    a second lens group having a positive refractive power, the second lens group comprising a third lens, a fourth lens and a fifth lens, and the third lens having a positive refractive power;
    a third lens group having a negative refractive power, the third lens group comprising a sixth lens; and
    a fourth lens group having a positive refractive power, the fourth lens group comprising a seventh lens and an eighth lens,
    wherein at least one of the first lens to the eighth lens is an aspheric lens,
    wherein, by changing positions on the optical axis of at least two lens groups in the second lens group, the third lens group and the fourth lens group, the zoom lens assembly switches between a wide-angle state and a telephoto state, and a focal length of the zoom lens assembly changes linearly during the zoom lens assembly switches from the wide-angle state to the telephoto state, and
    wherein −1.3<f4/f5<−0.8,
    where f4 is an effective focal length of the fourth lens, and f5 is an effective focal length of the fifth lens.

2. The zoom lens assembly according to claim 1, wherein $0.8<f3/fG2<1.2$,
wherein f3 is an effective focal length of the third lens, and f5 is an effective focal length of the second lens group.

3. The zoom lens assembly according to claim 1, wherein $0.8<f1/fG1<1.3$,
wherein f1 is an effective focal length of the first lens, and fG1 is an effective focal length of the first lens group.

4. The zoom lens assembly according to claim 1, wherein $0.5<R4/R5<1$,
wherein R4 is a radius of curvature of an image-side surface of the second lens, and R5 is a radius of curvature of an object-side surface of the third lens.

5. The zoom lens assembly according to claim 1, wherein $0.8<fG4/((fw+ft)/2)<1.3$,
wherein fG4 is an effective focal length of the fourth lens group, fw is a total effective focal length of the zoom lens assembly in the wide-angle state, and ft is a total effective focal length of the zoom lens assembly in the telephoto state.

6. The zoom lens assembly according to claim 1, wherein $1<TTL/ft<1.5$,
wherein TTL is a distance along the optical axis from an object-side surface of the first lens to an image plane of the zoom lens assembly, and ft is a total effective focal length of the zoom lens assembly in the telephoto state.

7. The zoom lens assembly according to claim 1, wherein $0<10\times\Sigma ATG2/TG2<0.5$,
wherein $\Sigma ATG2$ is a sum of a spacing distance between the third lens and the fourth lens and a spacing distance between the fourth lens and the fifth lens, and TG2 is a distance along the optical axis from the object-side surface of the third lens to an image-side surface of the fifth lens.

8. The zoom lens assembly according to claim 1, wherein $1<100\times TG3/\Sigma CT<5$,
wherein TG3 is a distance along the optical axis from an object-side surface of the sixth lens to an image-side surface of the sixth lens, and $\Sigma CT$ is a sum of respective center thicknesses of the first lens to the eighth lens along the optical axis.

9. The zoom lens assembly according to claim 1, wherein $0.5<SAG71/SAG81<1.2$,
wherein SAG71 is a distance along the optical axis from an intersection point of an object-side surface of the seventh lens and the optical axis to a vertex of an effective radius of the object-side surface of the seventh lens, and SAG81 is a distance along the optical axis from an intersection point of an object-side surface of the eighth lens and the optical axis to a vertex of an effective radius of the object-side surface of the eighth lens.

10. The zoom lens assembly according to claim 1, wherein $0<SAG71/CT7<0.5$,
wherein SAG71 is a distance along the optical axis from an intersection point of an object-side surface of the seventh lens and the optical axis to a vertex of an effective radius of the object-side surface of the seventh lens, and CT7 is a center thickness of the seventh lens.

11. The zoom lens assembly according to claim 1, wherein $0.5<CT1/ET1<1$,
wherein CT1 is a center thickness of the first lens, and ET1 is an edge thickness at the maximal effective radius of the first lens.

12. The zoom lens assembly according to claim 1, wherein $1<CT7/ET7<1.6$,
wherein CT7 is the center thickness of the seventh lens, ET7 is an edge thickness at the maximal effective radius of the seventh lens.

13. The zoom lens assembly according to claim 1, wherein $0.7<DT81/ImgH<1$,
wherein DT81 is an effective radius of the object-side surface of the eighth lens, and ImgH is half of a diagonal length of an effective pixel area on the image plane of the zoom lens assembly.

14. The zoom lens assembly according to claim 1, wherein $1<DTmax/DTmin<1.5$,
wherein DTmax is a maximal value of effective radii of lenses in the zoom lens assembly, and DTmin is a minimal value of the effective radii of lenses in the zoom lens assembly.

15. The zoom lens assembly according to claim 1, wherein $0<(R13-R14)/(R13+R14)<0.5$,
wherein R13 is a radius of curvature of the object-side surface of the seventh lens, and R14 is a radius of curvature of the image-side surface of the seventh lens.

16. The zoom lens assembly according to claim 1, wherein $-0.8<\Delta TG12/\Delta f<-0.3$,
wherein $\Delta TG12$ is a change of a spacing distance between the first lens group and the second lens group along the optical axis when the zoom lens assembly switches from the wide-angle state to the telephoto state, and $\Delta f$ is a change of a total effective focal length of the zoom lens assembly when the zoom lens assembly switches from the wide-angle state to the telephoto state.

* * * * *